(12) United States Patent
Shanishchara et al.

(10) Patent No.: US 9,273,982 B2
(45) Date of Patent: Mar. 1, 2016

(54) HYBRID LOCATION TEST SYSTEM AND METHOD

(71) Applicant: Spirent Communications, Inc., Sunnyvale, CA (US)

(72) Inventors: Kunal Shanishchara, Ocean, NJ (US); Brock Butler, Ocean, NJ (US); Jason Davis, Tinton Falls, NJ (US); Ram Garapaty, Middletown, NJ (US); Manikantan Parameswaran, Long Branch, NJ (US); John Pottle, Newton Abbot (GB); Colin Ford, Dryslwyn (GB)

(73) Assignee: Spirent Communications, Inc., Sunnyvale, CA (US)

( * ) Notice: Subject to any disclaimer, the term of this patent is extended or adjusted under 35 U.S.C. 154(b) by 455 days.

(21) Appl. No.: 13/789,176

(22) Filed: Mar. 7, 2013

(65) Prior Publication Data

US 2013/0338958 A1    Dec. 19, 2013

Related U.S. Application Data

(60) Provisional application No. 61/659,932, filed on Jun. 14, 2012.

(51) Int. Cl.
*G06F 19/00* (2011.01)
*G01C 25/00* (2006.01)

(52) U.S. Cl.
CPC ..................................... *G01C 25/00* (2013.01)

(58) Field of Classification Search
CPC ...... G08G 1/161; G01S 17/023; B60W 30/16
USPC ................. 702/116, 117, 118, 182–185, 188
See application file for complete search history.

(56) References Cited

U.S. PATENT DOCUMENTS

| | | | | |
|---|---|---|---|---|
| 2010/0130229 A1* | 5/2010 | Sridhara | ................ | G01S 19/49 455/456.1 |
| 2010/0171659 A1* | 7/2010 | Waters | ................... | H04B 17/24 342/357.74 |
| 2012/0221244 A1* | 8/2012 | Georgy | ................ | G01C 21/165 701/472 |
| 2013/0136154 A1* | 5/2013 | Chomal | ............... | H04B 1/7075 375/136 |

* cited by examiner

*Primary Examiner* — Edward Raymond
(74) *Attorney, Agent, or Firm* — Haynes Beffel & Wolfeld LLP; Ernest J. Beffel, Jr.

(57) ABSTRACT

The technology disclosed relates to testing hybrid positioning systems, including systems that rely on MEMS sensors. In particular, it relates to methods and devices for configuring and running tests of hybrid positioning systems.

21 Claims, 16 Drawing Sheets

FIG. 14

Error model

Enable ☑ —1641

Fixed offset [0] m

Ramp error —1643

Start time [0] days [00:00:00]

Rate [0] m/s

Sinusoidal error —1645

Amplitude [0] m

Period [1000] s

Phase [0] s

Gauss-Markov noise —1647

Random seed [1]

Standard Deviation [0] m

Time constant [100] s

FIG. 16

HYBRID LOCATION TEST SYSTEM AND METHOD

This application claims the benefit of US Provisional Application No. 61/659,932, entitled "HYBRID LOCATION TEST SYSTEM AND METHOD", filed on Jun. 14, 2012.

BACKGROUND

The technology disclosed relates to testing hybrid positioning systems, including systems that rely on MEMS sensors. In particular, it relates to methods and devices for configuring and running tests of hybrid positioning systems.

Designers of smart phones, hand-held devices and other portable devices that deliver position data face increasing challenges to deliver accurate location data in difficult environments. The challenges arise from both regulatory requirements and consumer expectations. At least in the United States, regulations for E-911 service require manufacturers of some communication devices that are used to contact 911 emergency services to assist emergency operators in locating the caller. This is evolving to include identification of the floor in a building from which the call originated. From consumer's expectations, requirements for accurate positioning are more exacting. Consumers reportedly desire information for navigation purposes with an accuracy of 3 to 10 m, in all environments. Challenging environments include urban canyons, where multi-path reflections of signals complicate analysis. Even more challenging are indoor environments that either receive no signal from global navigation satellite systems (GNSS) or that receive only reflected, distorted and/or weak signals.

Space ships, aircraft and rockets have used expensive inertial guidance systems as an alternative to relying on global navigation satellite constellations. Inertial guidance systems support dead reckoning, both intermittently and for extended periods of time, even when external reference signals are unavailable or unreliable. However, traditional inertial guidance sensors are too large, too expensive and too inflexible to be adapted to a handheld device.

Microelectronic mechanical sensors (MEMS) hold promise for providing functionality of similar to inertial guidance systems, while satisfying the form factor and production budget requirements for handheld devices. However, they are noisy, in an information theory sense, and operate in an algorithmically challenging environment. Human motion is algorithmically challenging because the position and orientation of the handheld device can vary rapidly, relative to overall movement of a person or vehicle conveying the handheld device. For instance, sensors in a smart phone will sense a pedestrian's stride and the pedestrian's gestures to operate the phone, such as viewing a text message or making a telephone call. Some observers have predicted that it will take another 3 to 5 years to develop practical algorithms that utilize MEMS data for dead reckoning over more than just a few seconds.

An opportunity arises to provide new and improved tools for use by developers and producers of smart phones, handheld devices and other portable devices that deliver position data. In particular, this disclosure focuses on test tools.

INCORPORATION BY REFERENCE

Three data sheets for soon to be introduced commercial products accompany and form part of this disclosure. The products described practice aspects of the technology disclosed.

The data sheets incorporated by reference are:
(1) Spirent CS8 R&D Testing—Hybrid Location Technology Solution (©2012 Spirent Communications, Inc.)
(2) Hybrid Location Test System (HLTS) Product Introduction
(3) SimSENSOR MEMS Sensor Simulation Datasheet with Product Specification

SUMMARY

The technology disclosed relates to testing hybrid positioning systems, including systems that rely on MEMS sensors. In particular, it relates to methods and devices for configuring and running tests of hybrid positioning systems. Particular aspects of the technology disclosed are described in the claims, specification and drawings.

A variety of issues can be addressed by implementations of this technology. Performance of devices can be quantified, so the developers do not need to be satisfied with something that "seems to work". Bench testing can be substituted for field testing, which is expensive and is neither controllable nor repeatable. Devices under test can be tested in challenging field conditions, such as rogue error conditions and handovers between different types of technology, even technologies that have not yet been deployed. Alternative WiFi positioning technologies and providers of WiFi positioning services can be compared. Total solutions can be tested, end-to-end. Positioning algorithms can be refined. System performance can be refined over a range of environments. Standards-based test cases can be developed. Performance levels can be demonstrated to customers and/or regulators. Performance can be fine tuned to take into account devices moving among environments that require different positioning technologies.

A variety of features can be mixed and matched in various implementations. Measurement and replay can be used to measure, capture and deploy received signal strength indicators for WiFi trajectory data for GPS, and then signal characteristics. Measured signals can be combined with sensor emulation. During measurement, multiple measurement devices can be used to ensure that the true position of the recording unit is identified. Simulation can be used instead of measurement and replay. Graphic user interfaces (GUIs) can provide for development of test scenarios with consistent movement data. Positioning servers can be supported. A data pipe can provide connectivity to positioning servers. Turnkey interaction with selected third party positioning servers can be supported. A software development kit can be provided to adapt the system to user selected or prototype positioning servers. Automation support and development library services can be provided. Basic automation support can run scenarios. Advanced automation support can be made available through an API known as development library services (DLS). Standardized, pre-canned test suites can be provided. These automated test suites can be delivered as packages. Cellular positioning can be supported. Position localization can be supported by using cell IDs. Cellular assistance for positioning can be supported, as can timing-related cellular positioning technologies. WiFi positioning support can utilize both 2.4 GHz and 5 GHz bands. Multiple access points can be supported and access provided for end-to-end data connectivity from a device under test to a third party server. A WiFi access point beacon transmission rate can be configurable and handoffs between access points can be supported. Both conducted and radiated RF signals can be supported. Conducted signals are carried on a cable, such as a coaxial cable. Radiated signals are transmitted over-the-air and received by the device under test's antenna. For connected tests, the effect of antenna geometry and proximity to other objects can be emulated. For radiated tests, the device under test can be mounted on a server that allows orientation of the device with multiple degrees of freedom. Changing the device orientation mechanically during tests can partially simulate gestures. Parameters of signals emulated or replayed during a test can be logged. Logging can include beacon frames, probe requests and probe responses.

MEMS sensors can include accelerometers, gyroscopes, compasses, pressure and barometric sensors, magnetometers, ambient light and temperature sensors and proximity sensors.

BRIEF DESCRIPTION OF THE DRAWINGS

FIGS. 4-5 illustrate implementations of overall systems used to test a development board, prototype or integrated product.

FIG. 14 is an example of an interface used to specify general parameters for sensors.

FIG. 16 is an example of an error model. In particular, this illustrates a barometer error model.

DETAILED DESCRIPTION

The following detailed description is made with reference to the figures. Preferred embodiments are described to illustrate the technology disclosed, not to limit its scope, which is defined by the claims. Those of ordinary skill in the art will recognize a variety of equivalent variations on the description that follows.

Increasingly, personal devices such as modern smart phones contain sensors such as MEMS accelerometers, gyroscopes, compasses, pressure and barometric sensors, magnetometers, ambient light and temperature sensors and proximity sensors. The technology disclosed includes test development and testing methods; the equipment and methods disclosed are useful for chip set and board level development and for testing of prototypes and integrated products. It can be useful in operating system and end-to-end hybrid engine development. Mobile solution provides for WiFi positioning, cellular carriers, device manufacturers, and test labs are additional anticipated users. This technology integrates testing of multiple sources of data used for positioning.

Inclusion of accelerometers and gyroscopes in personal devices gives the devices the ability to detect a full six degrees of freedom in the inertial frame. Modern personal devices also have the ability to detect and use GNSS signals for position and navigation purposes however, the GNSS signal cannot be relied upon, for instance when the user of the device enters a building. GNSS chipset manufacturers are now combining GNSS navigation with other sensors within the personal device to obtain more accurate position for location-based services navigation. These sensors are favored because they are always available and accurate over the short term. They do not provide a position fix, only interim motion between positions identified in another way. Errors in dead reckoning from MEMS sensors accumulate quickly, so dead reckoning becomes unusable in less than 30 seconds. The combination of the sensors is sometimes called sensor fusion or signals of opportunity. Manufacturers and vendors face challenges in developing and testing these devices with real world data. The technology described herein can realistically simulate noisy, MEMS grade sensors in the challenging domain of human motion.

Figure 1:
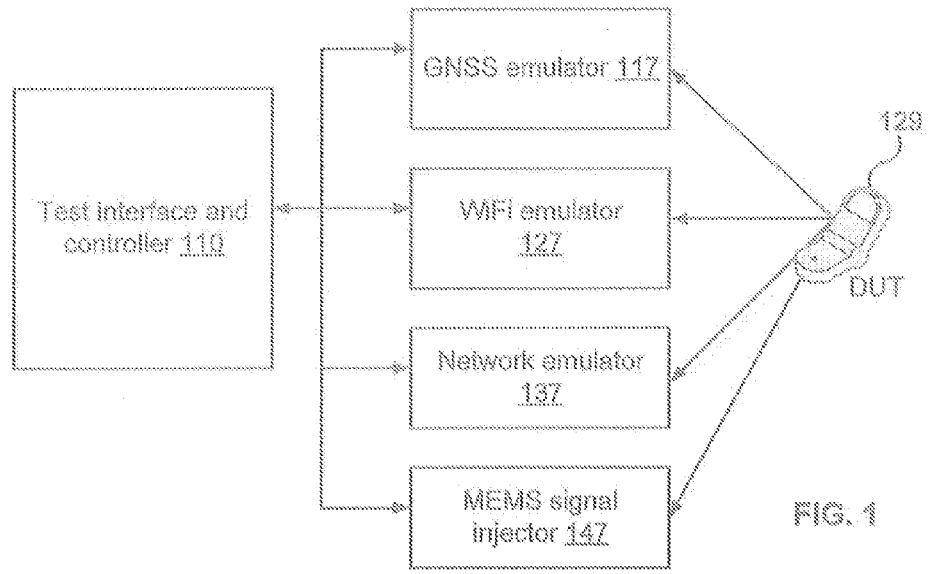
FIG. 1 is an example system implementation that includes a test interface and controller that coordinates emulation of multiple test signals.

As illustrated in FIG. 1, a system implementation of this technology can include a test interface and controller 110 that coordinates test signals that emulate GNSS or GPS signals from satellites 117, WiFi signals from access points 127, cellular signals from towers and so-called femtocells 137, and MEMS data sensed on the portable device 147.

A chip development user for instance, may use this system to add hybrid positioning to a chipset. Emulation of multiple signals allows the chipset developer to determine whether analysis of additional signals improves positioning accuracy over use of GPS alone, under a variety of conditions. A system developer can improve their positioning algorithms using bench top testing instead of field testing, using the hybrid test system. For this purpose, both simulation and measure and replay modes can be used. In simulation mode, models of environmental conditions are combined with test parameters. In measure and replay mode, field measurements are collected and resolved into test parameters. The test parameters are used by the emulators to reproduce the measured conditions. In some implementations, the hybrid system can replay WiFi access point beacon frames, simulate cellular handovers and replicate probe response time, all based on data collected in the field. The measure and replay mode can be used iteratively with the simulation mode to exercise, prove and improve models that originally were intended for test data signal tests, not for positioning response tests.

A suite of tests supported by implementations described can address a wide range of issues. Tests can address measurement accuracy, sensitivity, dynamic range testing, handoffs, rouge or threat signals, signal congestion, conformance, real-world environments, motion trajectories, alternative technologies and protocols.

Figure 2:
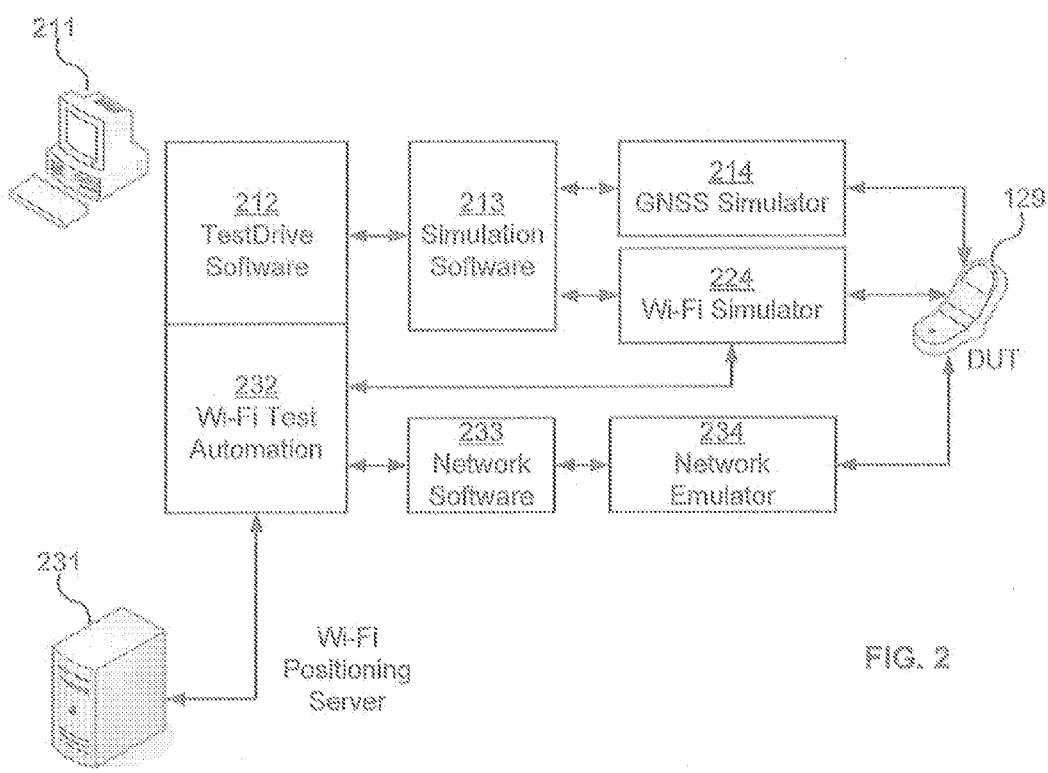
FIG. 2 is a high level block diagram of a system that includes a WiFi simulator used in conjunction with a GNSS simulator and a network emulator.

Previous development by this assignee included integration of testing GNSS and WiFi positioning signals, as described in U.S. application Ser. No. 12/976,756, entitled "WiFi Positioning Bench Test Method and Instrument", filed Dec. 22, 2010, which is hereby incorporated by reference. FIG. 2 is a high level block diagram of a system that includes a WiFi simulator 224 used in conjunction with a GNSS simulator 214 and a network emulator 234. The WiFi simulator was the focus of the '756 application. The GNSS simulator may be a device such as commercially available from Spirent, model numbers GSS6560 or GSS6700. The network emulator is also commercially available from Spirent, such as E2010, SR3420, SR3452 or SR3462. The GNSS simulator supplies signals that the DUT would receive from satellites for positioning. This simulator may switch between clear sky and indoor modes and may produce noise and/or multipath characteristics of urban canyons and other GNSS-hostile environments. The network emulator supplies signals that the DUT would receive from cellular towers, such as 2G, 3G or 4G network towers. The network emulator may simulate voice traffic and also may carry data. The network emulator 234 and WiFi simulator 224 provide alternative channels to link the DUT 225 to a WiFi positioning server 231. Simulation control software 213 may coordinate signals generated by the GNSS and WiFi simulators, using the same simulated DUT location for generation of both types of signals. Network software 233 works in connection with the network emulator 234. From a test console 211, a user may operate test manager software 212 and WiFi test automation software 232 to exercise replay and simulation test modes. The system in FIG. 1 provides additional capabilities not found in prior systems, including the one illustrated in FIG. 2.

Figure 3A:
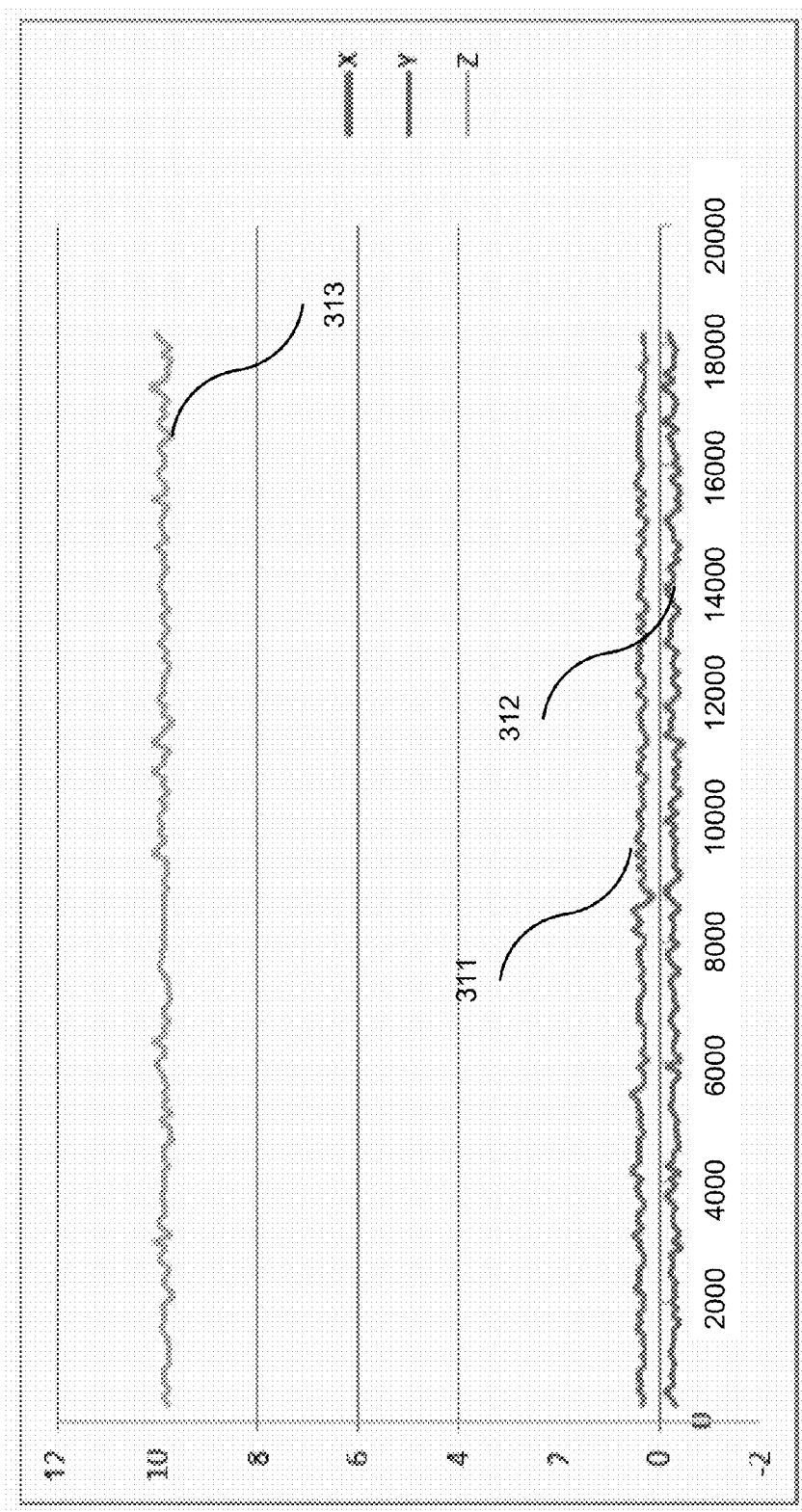
FIGS. 3A-C illustrate MEMS noise and complexity of human motion.

FIG. 3 illustrates noise and MEMS sensors and complexity of human motion. FIG. 3A is an example of recorded accelerometer output from a stationary device sitting horizontally on a flat surface. On the z-axis sensor 313, at approximately 9.8 m/sec$^2$, detects gravity. Stationary readings for the X and Y axes 311, 312 are slightly offset from zero. Readings are given for approximately 20,000 ms. This figure illustrates baseline noise from the sensors.

Figure 3B:
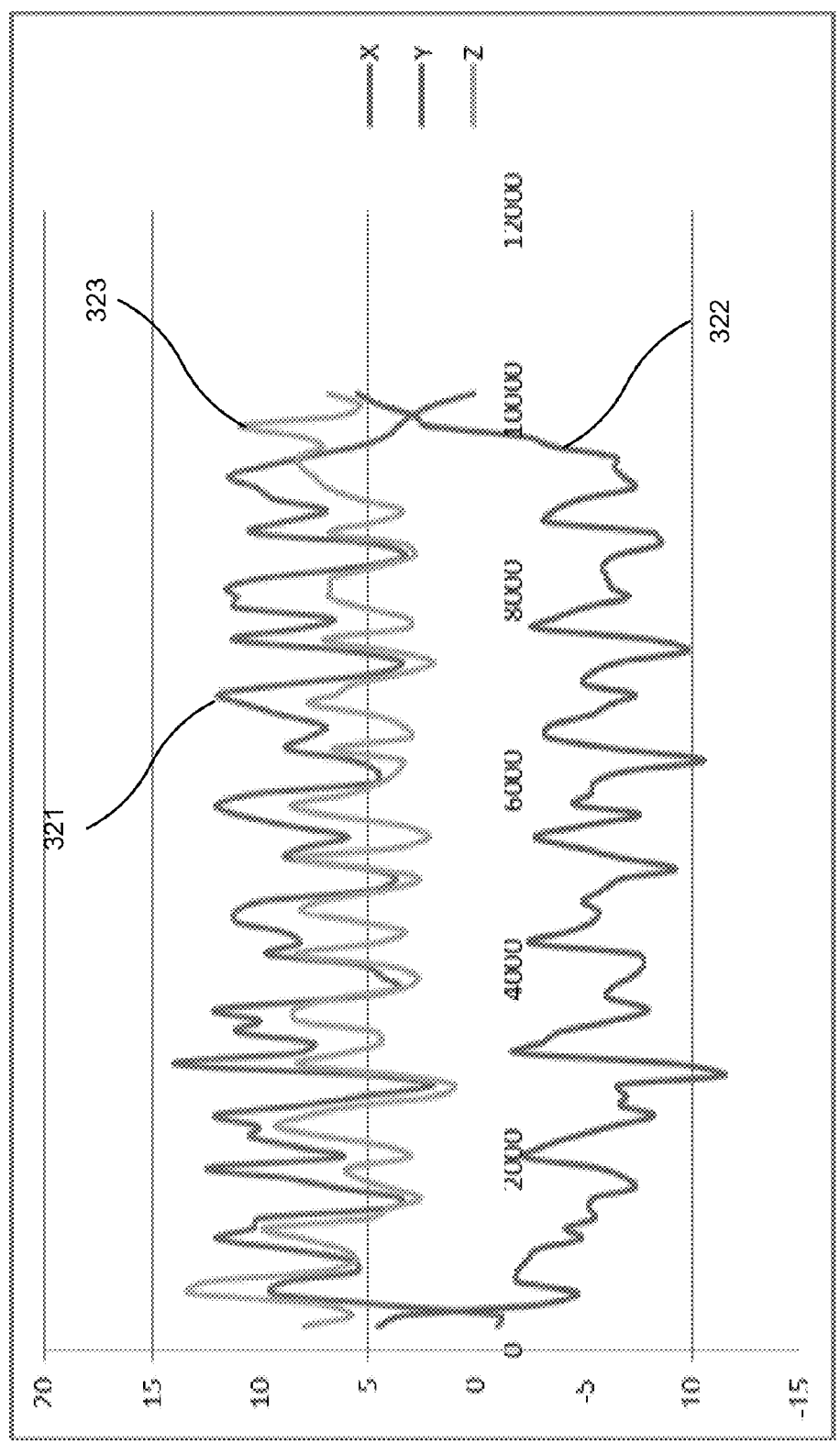

FIG. 3B is example of recorded accelerometer output from device held in a person's hand while walking. In this example, the x-axis runs from left to right across the face the phone. The y-axis runs from top to bottom of the phone in the z-axis runs from the front the back of the phone. Readings in meters per second squared are given for approximately 10,000 ms, reported for X, Y and Z axes 321, 322, 323.

Figure 3C:
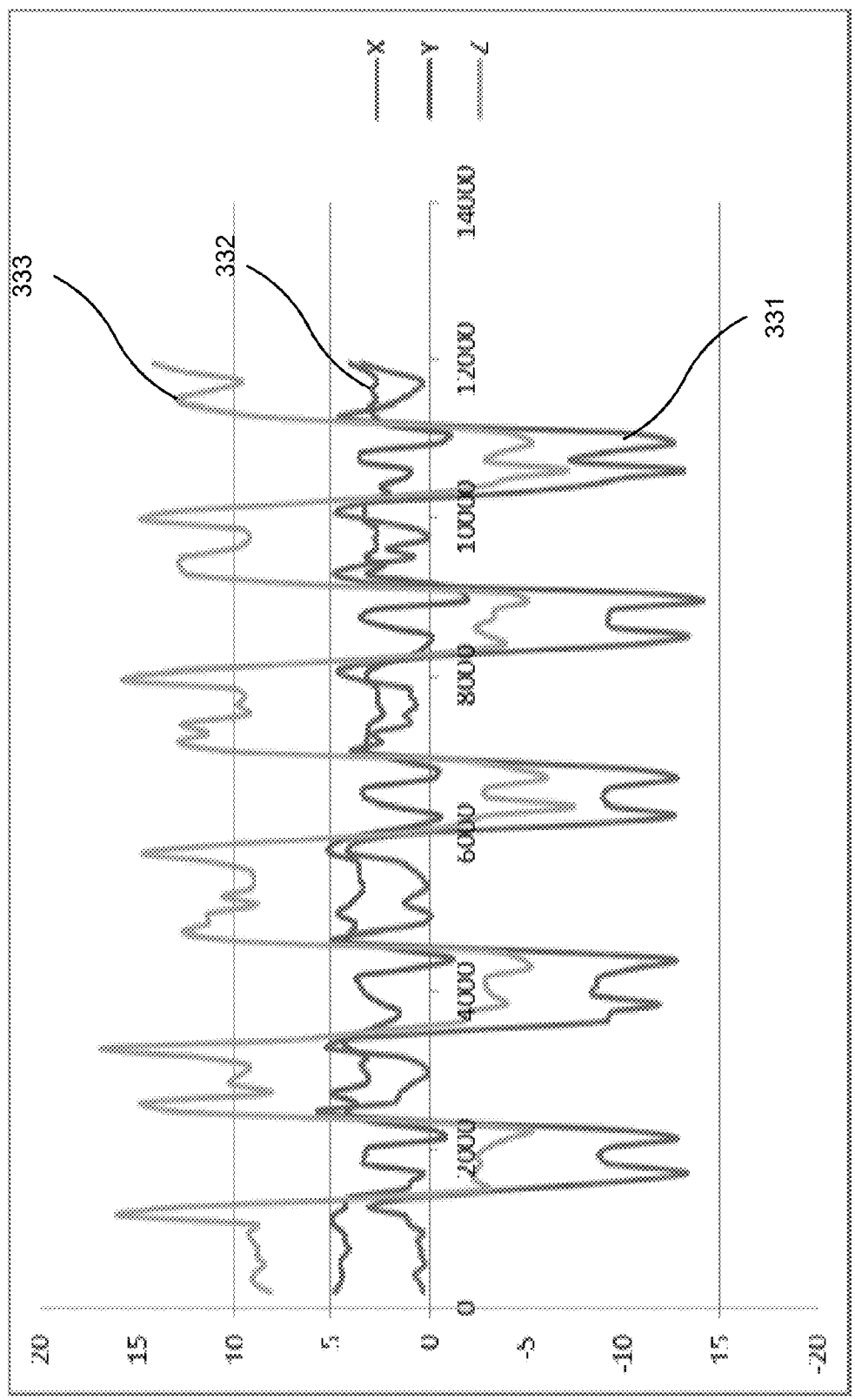

FIG. 3C is example of recorded accelerometer output as a person answered a phone call. The answering gesture included looking at the screen. The gesture was carried out five times, revealing a fair degree of repeatability. Readings in meters per second squared are given for approximately 12,000 ms, reported for X, Y and Z axes 331, 332, 333.

These high-frequency accelerometer readings are different than the lower frequency, smoothed readings of a navigational GPS. A major part of the development of navigational capabilities based on MEMS accelerometers will be translating high-frequency samples into linear motion. Testing support overlays gestures, such as walking and answering the phone, on a path traveled by the person carrying the phone. Relatively high frequency changes in acceleration due to gestures and/or vehicle ride are added to baseline path trajectories to emulate signals produced by movement of the device under test.

In one implementation, motion terms are used to record the trajectory information for human motion in more detail than the industry standard NMEA motion file. Motion terms can include position, velocity, attitude, angular velocity and angular accelerations. In addition, motion terms can include changes in angular accelerations.

In some motions, a broad range of acceleration is expected. While humans can only tolerate sustained acceleration of a few g's, say up to 10 g in a fighter pilot's flight suit, parts the body commonly undergo brief accelerations up to +/−10 g during normal walking. For navigation, accelerometers must have an operational range of at least +/−10 g. Mechanical accelerometers typically have a range of +/−100 g. The dynamic operating range of the MEMS accelerometer can affect the quantization error, especially if the output is in a fixed number of bits. Output resolution often is in the range of 10-12 bits, but can be greater.

MEMS gyros typically operate in dynamic ranges from +/−3 rad per second to +/−120 rad per second, depending on the model. Output resolution to be in the range of 16 bits.

Output from the MEMS signal emulator 147 to the device under test 129 can be in the form of UDP packets over Ethernet or WiFi. The user can be given the ability to control sensor update rates. In one implementation, available update rates range from 10 Hz to 100 kHz. Device manufacturers provide API documentation for the sensors included in their devices. The sensor update rate can impact the number of data packets produced. These packets can be output at a base simulation iteration rate. When the base simulation iteration rate is lower than the sensor update rate, more than one sensor packet of data can be transmitted in each sensor iteration rate epoch. As an example, if the simulation iteration rate is 100 Hz and the sensor update rate is 500 Hz, five packets of sensor data can be transmitted every 10 ms. The separate packets of data can be time stamped with their precise time of applicability or the delivery time can be inferred from the simulation iteration rate epoch and packet sequence number. The UDP packets can be transmitted ahead of time, so that the receiver of the data associated with the device under test has time to process the packets and deliver them as scheduled.

UDP packets can be translated to a unit under test (UUT) host converter, for instance one using an I2C device.

In one implementation, data fields of a sensor data packet can include:

type—type of packet, such as "imu_data"

version—of the data stream time into Ron—current time and simulation, in milliseconds time of validity—time in milliseconds of the simulation iteration rate epic for which this packet is valid vehicle—ID of a vehicle to which the packet of data applies model number—ID of the sensor on the vehicle, among multiple sensors allowed for a vehicle duration of validity—time of validity in seconds for data provided Delta no errors velocity—an array of values describing velocity change over the most recent simulation period Delta no errors theta—an array of values describing the attitude change of the device under test over the most recent simulation period Delta errored velocity—an array of values describing velocity change after application of error terms over the most recent simulation period Delta errored theta—an array of values describing attitude change after application of error terms over the most recent simulation period barometric height—barometric height; optionally barometric pressure digital compass heading—compass heading in radians, degrees or another preferred measure magnetometer—an array of values describing magnetic orientation; can be output in micro-tesla gravity—array of values describing a reading of gravity at the current position In this context, vehicle can refer to a pedestrian. Generally, "vehicle" refers to whatever is following the specified trajectory. The specified trajectory can be given with respect to the center of gravity of the vehicle. For a person, a center of gravity can be selected and not repositioned as body parts move.

In one implementation, the pedestrian model includes sub models: at least a linear motion model, a systematic offset model, random offset model, and an auxiliary motion model. Linear motion model defines the underlying motion profile of the pedestrian. That is, the pedestrian's change in location. This can be accomplished by commands such as accelerate, decelerate, constant velocity, and turn. This is similar to other vehicle models. The systematic offset model to calculate deterministic effects that are characteristic of a person walking or running. This can be a sinusoidal motion that automatically changes in frequency and amplitude with the pedestrian's walking speed. It can be more complex, as evidenced in FIG. 3B. The systematic offset model can be applied primarily to the vertical axis. The random offset model can be used to apply jitter to the motion in both vertical and lateral planes, to simulate natural variations in walking motion. For instance, it could simulate a person deviating from a straight line to avoid other pedestrians. The random offset model could be of a lower frequency than other sub models. The exhilarating motion model can handle gestures. For instance, it can handle gestures to answer the phone, check text messages, or surf the web. Short commands apply to particular gestures. Net motion would be the sum of these elements.

Another implementation of pedestrian motion is to create a library of recorded motions for various gestures, for walking or running motions, and for random offsets. For instance, library motions can include walking a straight line, turns of various angles, gestures to answer a call, and gestures to hold the phone in front of a user's body, both while stationary and walking. A variety of sensors are available that should enable analysis of pedestrian motion and modeling.

Another implementation of pedestrian motion modeling derives position, velocity, attitude, angular velocity and angular acceleration components from smoothed output of an ergonomically accurate animation of gesture paths. Human posture models have been developed for workplace analysis and training simulations. Human figures can be dressed for a particular setting and stepped through motions to produce animations of motions, such as motions on an assembly line or during combat maneuvers. Analysis of animations from these models shows that they tend to be jerky, when acceleration is considered. Ergonomic models can produce rough animations, because the human eye has a limited ability to sense frame-to-frame changes. Ergonomically accurate animations are not intended to produce sensible angular accelerations. Accordingly, path information from animation of gestures needs to be smoothed to produce sensible acceleration values, instead of instantaneous reversals of direction. Ranges of acceleration can be established by measuring actual accelerations of humans moving through the same gestures that are ergonomically modeled. APIs are available on smart phones for recording these accelerations. These ranges can be applied to smoothing paths derived from ergonomically modeled gestures.

Another implementation of pedestrian motion modeling is to capture the motion and gestures of a pedestrian using a small light weight IMU (inertial measurement unit) or GNSS device such as the XSens MTi-G. This device can be strapped to the user's body, for instance the palm of a hand, and can be used along with a laptop computer in a backpack to record the IMU and GNSS 6-DOF movement of the appendage that the unit is strapped to. Due to the light weigh nature of the device the user can perform natural movements such as answering and fidgeting with a phone, which can be recorded on the laptop computer.

In some implementations, the user can take the recorded data and run it through a smoothing software to remove any large spikes or jerks in the data due to satellite drop outs or time slips. The output of the run can be a UMT that can be directly fed to and played back through the simulator 224. The smoothing software can also translocate the recorded trajectory to a fresh starting position with new latitude and longitude co-ordinates. This translocation facilitates recordings at high signal strength locations, which results in maximum accuracy and minimum drift of the IMU sensors. The smoothing software can also record the current satellites being tracked and further produce a separate simulation input file. This input file in combination with the recording's almanac file can be used for simulating satellite outages.

In some implementations, pedestrian gestures and motion can be captured in real-time using a full body internal motion capture system such as the XSens MVN. The MVN motion capture system is fully ambulatory and consists only of body worn sensors. This system can estimate body segment orientation and position changes by integrating gyroscope and accelerometer signals which are continuously updated by using a biomechanics model of the human body. This can result for in tracking of dynamic human body motion.

MVN motion capture can include a suit and a software engine. First, the MVN suit can collect and transmit raw sensor data that can then be treated by the MVN software engine, which interprets and reconstructs the data to full body motion while trying to minimize drift. The MVN suit can consist of 17 inertial MTx sensors that can be attached to key areas of the human body.

In some implementations, each MVN sensor can consist of a 3D gyroscope, 3D accelerometer and/or magnetometer. The raw signals from the sensors can be connected to a pair wireless transmitters such as Bluetooth devices that can transmit the raw motion capture data to a pair of wireless receivers. The data from the MVN suit can then be fed to the MVN software engine that uses sensor fusion algorithms to produce absolute orientation values. The absolute orientation values can be further used to transform 3D linear accelerations to global coordinates. The global coordinates can then be translated to a human body model that implements joint constraints to minimize integration drift.

In some implementations, the MVN motion capture system can output body motion data including the position, velocity, acceleration, orientation, angular velocity and/or angular acceleration of each body segment by expressing body postures sampled at a rate up to 120 Hz. The postures can be modeled by 23 body segments interconnected with 22 joints.

In some implementations, data can be transported from the MVN motion capture system to a scenario generator such as Spirent SimGEN product through a local area network (abbreviated LAN), wireless Area Network (abbreviated WLAN) or a data storage device such as USB, memory cards, etc. Once the motion scenario has been defined and stored, it can be recreated precisely time and time again. The scenario generator can quantify and compare MVN receiver performance for design verification, production test in manufacturing, comparative evaluation, statistical data-generation through extended and repeated tests, and incoming products test.

In some implementations, the scenario generator can have a MVN data-to-motion data conversion utility. It can also use the position, velocity, acceleration, orientation, angular velocity and/or angular acceleration of each body segment contained within the MVN data to reflect motion and signal variations of the pre-recorded pedestrian gestures and motion. In some implementations, the motion data can be generated by employing the utility to convert the logged MVN data into "*.umt" motion files. The motion file can contain motion commands at 100 ms intervals and the utility can generate a command file to construct a motion trajectory of the pedestrian gestures and motion.

Figure 4:
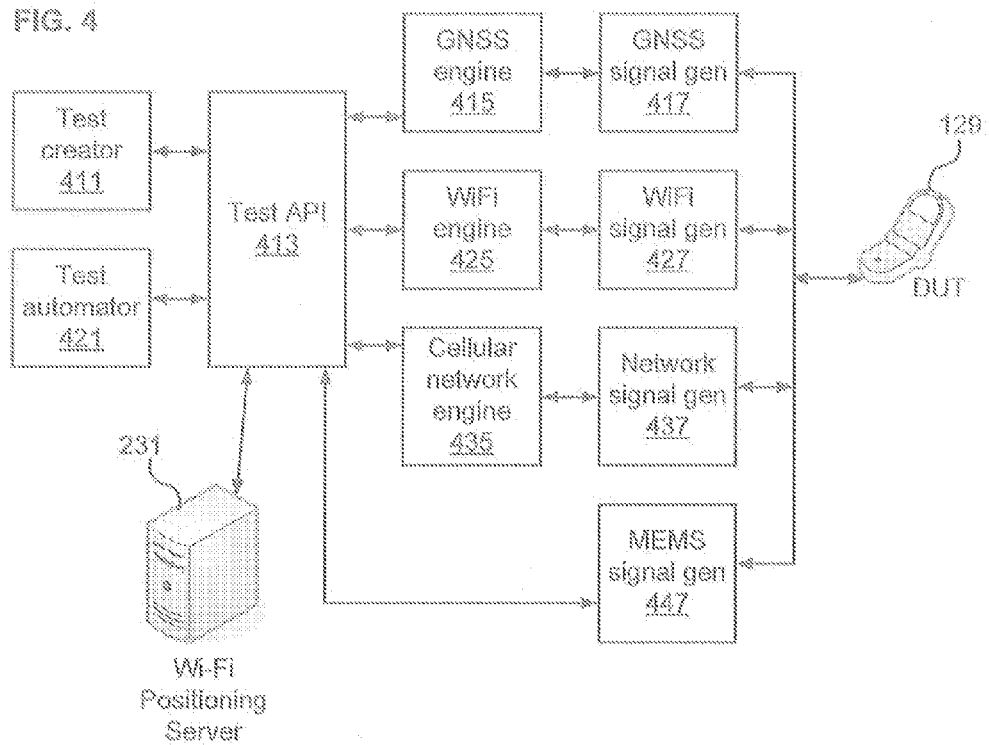

FIG. 4 illustrates one implementation of an overall system used to test a development board, prototype or integrated product 129. In this system, RF signal options can include GNSS 417, WiFi 427 and cellular 437. A MEMS sensor signal generator 447 also can be provided. The positioning server 231 can emulate a multi-location positioning server, SSE+SUPL servers or both. SSE is short for server emulator, which is middleware. SUPL is short for Secure User Place Location protocol, which is a wireless standard. In this implementation, a test creator 411 can be used to create a coherent scenario. An example of a test creator interface appears in FIG. 12. A test automator 421 uses a travel path and instructions to automate a test at a user selected simulation iteration rate. Both the test creator 411 and the test automator 421 operate through a test API 413. The test API provides interfaces to the GNSS engine 415, a WiFi engine 425 and a cellular network engine for 435. It also is coupled to a MEMS signal generator 447. The WiFi positioning server 231 also is accessed through the test API 413. The various engines in turn are connected to hardware that generates signals. This hardware can include a GNSS signal generator 417, a WiFi signal generator 427, a network signal generator 437 and a MEMS signal generator 447. Signals can be conducted or radiated RF signals directed to the device under test 129. Conducted signals are carried on a cable, such as a coaxial cable. Radiated signals are transmitted over the air and received by the device under test's antenna(s). For connected tests, the effect of antenna geometry and proximity to other objects can be emulated. For radiated tests, the support for the device under test can be repeated by a Servo with multiple degrees of freedom that partially simulates gestures.

FIG. 5 illustrates another implementation of an overall system used to test a development board, prototype or integrated product 529, with features that can be used in conjunction with other systems. In this system, RF options can include GNSS 517, WiFi 527 and cellular 537. A MEMS sensor signal generator 657 also can be provided. The positioning server 531 can emulate a multi-location positioning server, SSE+SUPL servers or both.

The scenario definition and control software (SDCS) 521 can support emulation of WiFi access points 525, a cellular base network 536, and GNSS constellations 515 without scripting or coding by the user. Approaches to generating scenario parameters include measure and replay and simulation, as mentioned above. In measure and replay mode, a so-called war drive is used to measure RSSI and other basic AP signal characteristics during a war drive cellular RSSI and IDs are also measured. During the same drive, GNSS NMEA data can be captured. Capture can continue through GNSS denied environments, such as indoors. Features of the received signals can be recorded as parameters suitable for replay, rather than the full data signal. In replay operation, the SDCS retrieves measured and parameterized data and emulates the measured signals.

The measured parameters can include the attitude of the portable device that is capturing the signals. Attitude can include orientation of the portable device, taking into account motion relative to a person or vehicle that is carrying the portable device. This attitude data can be combined with path and gesture data on replay to more reflect antenna performance. It can be used to emulate the effect of proximate objects such as a loose or tight gripped hand holding the device or a head when the device is held up to the ear. Knowing the attitude of the portable device during capture facilitates modification of attitude-related replay parameters.

Simulation and replay can use the same emulation hardware to generate signals. Measured data rates from a war drive can be stored in a format compatible with simulation parameters.

Simulation iteration frequencies can be synchronized between GNSS, WiFi and cellular. Rates such as 1, 10 or 100 Hz updates can be used. Note that MEMS iterations can be more frequent, as the sensor outputs change and emulated signal data can be updated more rapidly than the RF signal characteristics can be modified.

Assistance data for positioning can be provided over the cellular system. This data can be provided on the user plane or the control plane. Availability of A-GNSS data facilitates comparison of H-LTS vs. ULTS or PLTS technologies.

Figure 6:
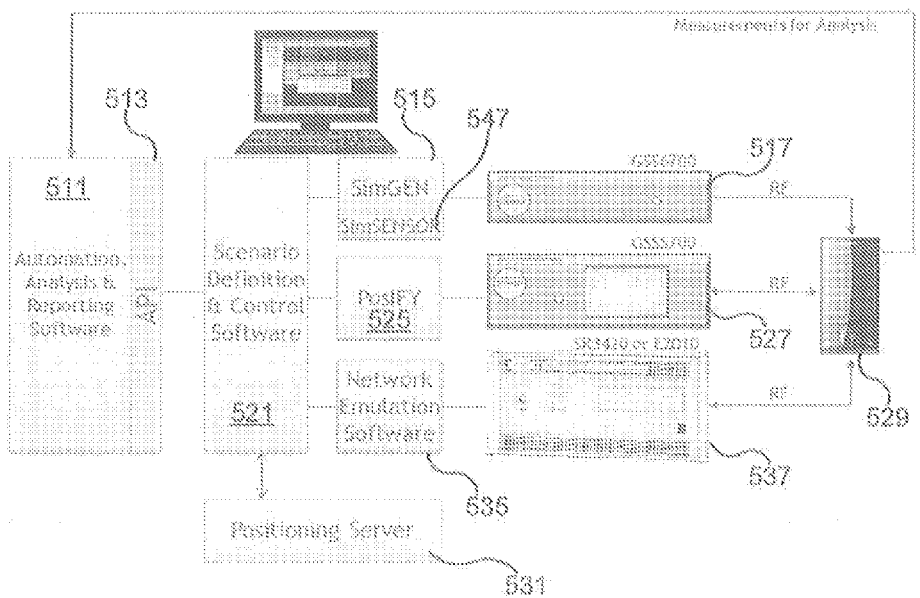
FIG. 6 explicitly adds errored sensor data to the other system implementations.
Figure 6:
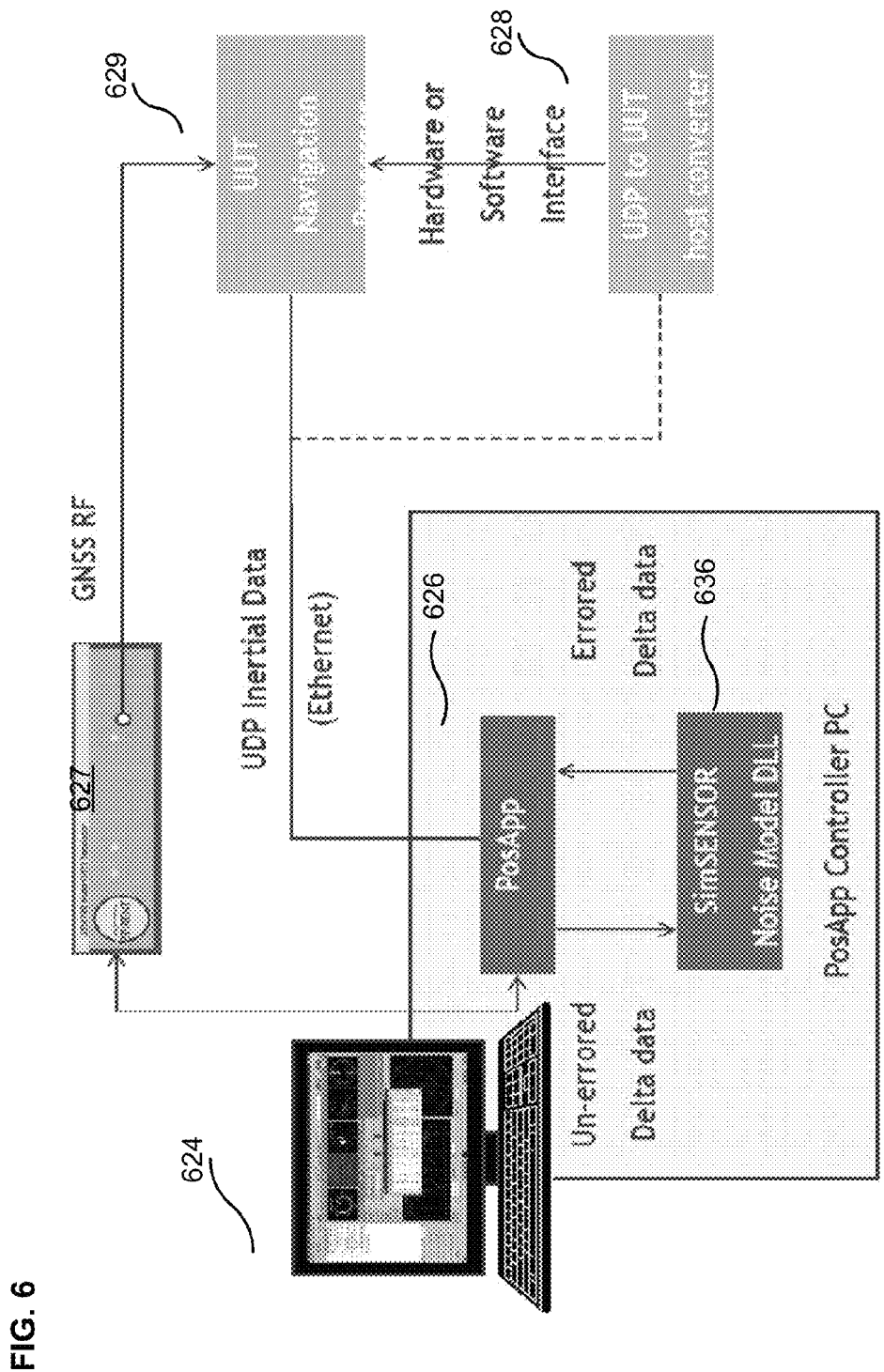

FIG. 6 explicitly adds errored sensor data to the other system implementations depicted. This figure focuses on the controller PC 624 and the generation of sensor emulation data. The controller PC 624 runs a PosApp module 626 that generates unerrored sensor data in a suitable format. This unerrored data is transmitted to a noise module 636 that is capable of modifying truth data by applying error terms. The noise module 636 can run on the same computer as the PosApp 626, a separate blade in the same server, a separate computer in the same cluster or another suitable machine. In some implementations, the controller PC 624 is coupled to the unit under test (UUT) 629 either directly or through an unreliable datagram packet (UDP)-to-UUT adapter 628. In other implementations, other communications protocols can be used to send sensor emulation signals to the UUT. In one implementation, the noise module is a DLL that can be used to generate noise for a variety of signals. It also could be integrated into the data generation, instead of being a separate module. In this figure, GNSS positioning data is also supplied by a GNSS signal generator 627 to the UUT 629.

A variety of noise models can be used. One is the NATO STANAG-4572 open source error module for high grade guidance systems. This model supports deterministic bias errors, scale factors and axis misalignments. It also supports stochastic random walk, Gaussian Markov first and second order noise models. Another noise model that can be applied is the so-called Allan variance model. This model supports random walk, Gaussian Markov, asymmetric scale and bias errors.

It is expected that additional noise models will be developed with experience characterizing MEMS devices. Factors that may be incorporated into an error model include temperature, as at least some MEMS devices are temperature sensitive.

Figure 7:
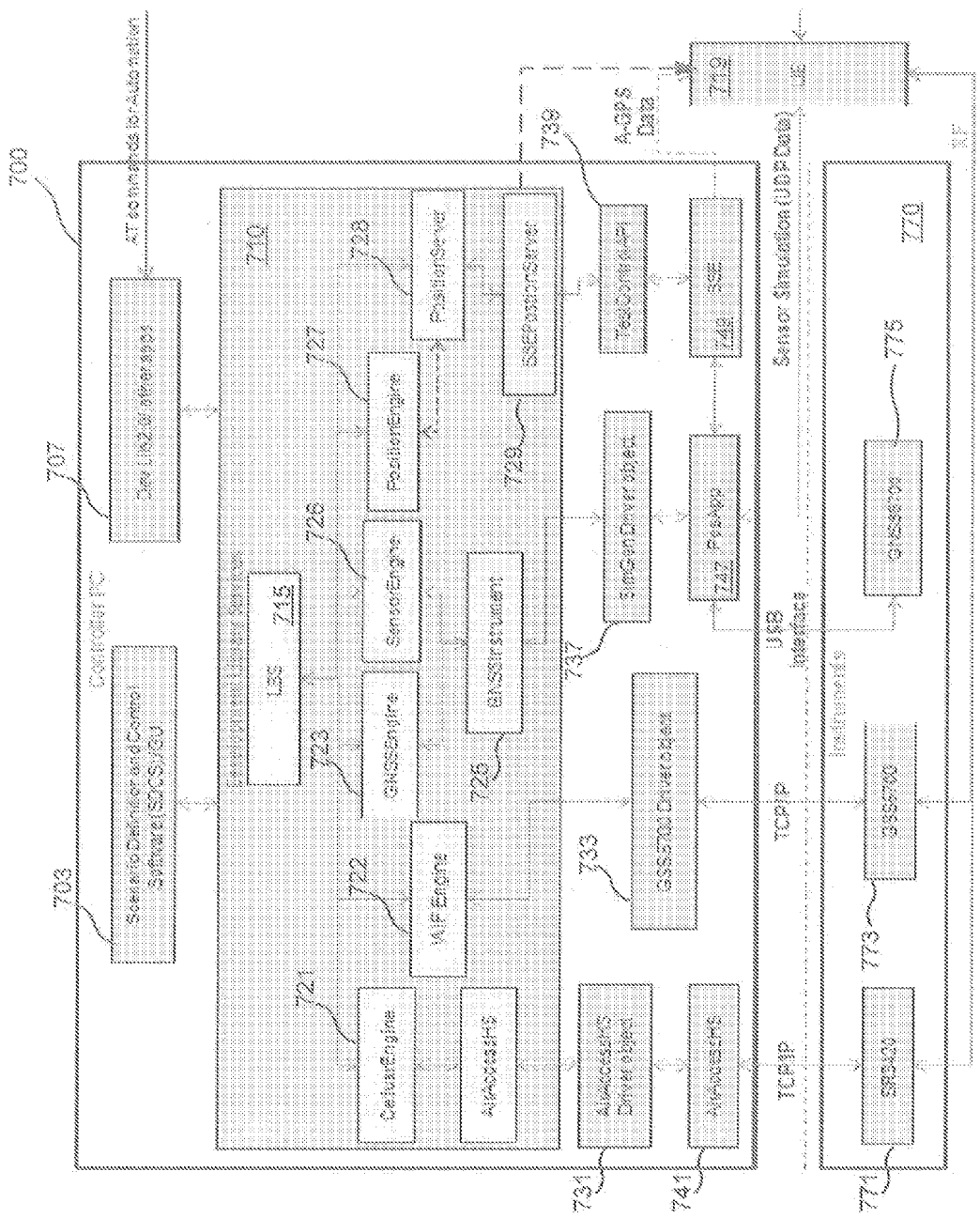
FIG. 7 shows a high-level software architecture for one implementation of the hybrid testing technology.

FIG. 7 shows high-level software architecture for one implementation of the hybrid testing technology. The controller PC 700 is coupled to one or more instruments 770. Both the controller PC 700 and the instrument 770 interact with the user equipment 719. A variety of communication channels can be used including RF, UDP and a results delivery channel that can deliver data from the UUT/DUT in real time or at the conclusion of the test.

The controller PC runs the scenario definition and control software (SDCS) 703, which corresponds to the test creator 414 and test automator 421, analysis applications 707, development library services (DLS) 710 and various drivers 731-749. The SDCS 703 is the layer above the development library services 710 that allows the user to create, edit, save and load the hybrid scenarios. It also will execute loaded scenario and provide real-time feedback to the user on conditions being reproduced by the system. Example GUIs that can be generated by SDCS appear in FIGS. 8-9. The SDCS 703 uses DLS APIs to configure and control instruments required for particular scenario.

The development library and other applications 707 process commands and data reported by the user equipment 719.

In some implementations, Windows Communication Foundation (WCF) can be used for communication between SDCS 703 and DLS 710. In these implementations, SDCS can be the only client of DLS. Information exchanged through WCF have may include, for LTE, E-UTRA Absolute Radio Frequency Channel Number (eArfcn), the number of cells, user equipment connection state, a reference receiver latitude, receipt reference receiver longitude, reference receiver altitude, hardware to use for cellular simulation, properties of the hardware available for simulation, a request to save a hybrid scenario, and a request for the status of a hybrid scenario.

The development library services 710 integrates new MEMS signal generation instruments. It includes a hybrid engine class (not illustrated) that loads and runs hybrid scenarios. The scenarios can be stored in an XML-based format. Portions of a scenario file are excerpted below. The file begins with a specification of HLTS configuration:

```
<?xml version='1.0' encoding='UTF-8'?>
<HLTS_configuration>
 <HLTS version='1.0'>
 <Mode>1</Mode>
 <Scenario_Location>C:\...\HLTSScenario.hsd</Scenario_Location>
```

One segment references configuration of the GNSS instrument:

```
<GNSS>
 <Enabled>1</Enabled>
 <Definition_File>C:\...\GNSSScenario.scn</Definition_File>
 <Scenario_Start_Date>19-04-2012</Scenario_Start_Date>
 <Scenario_Start_Time>18:34:27</Scenario_Start_Time>
 <Scenario_Duration>20</Scenario_Duration>
 <Simulated_Motion>C:\...\GNSSMotionfile.umt</Simulated_Motion>
        <Simulationsettings>
         <VechileType></VechileType>
         <MotionTrajectory></MotionTrajectory>
         <UMTFile></UMTFile> -- user motion trajectory
         <Yumafile></Yumafile> -- standard GNSS almanac variance
          updates
        </Simulationsettings>
        <ReplaySettings>
         <NMEAFile></NMEAFile> -- path data in standard format
         <Yumafile></Yumafile>
         <UMTFile></UMTFile>
          <Constellations></Constellations> -- which satellites
        </ReplaySettings>
</GNSS>
```

Another segment references configuration of the positioning instrument:

```
        <PositioningServer>
         <Enabled>1</Enabled>
         <PositionSeverType>1</PositionSeverType>
         <ResponseTime>20</ResponseTime>
         <SettingsFile>C:\...\SettingsFile</SettingsFile>
         <TransportType>1</TransportType>
         <PositioningProtocol>1</PositioningProtocol>
         <UserPlaneProtocol>1</UserPlaneProtocol>
         <PositioningMethod>1</PositioningMethod>
         <SessionType>1</SessionType>
        </PositioningServer>
```

Another segment references configuration of the WiFi instrument:

```
  <Wi-Fi>
   <Enabled>1</Enabled>
   <DatabaseFile>C:\...\WiFiScenario.sdb</DatabaseFile>
   <Simulationsettings>
        <Model>1</Model>
        <Two_Slope_Model>1</Two_Slope_Model>
        <Shadow_Fading>1</Shadow_Fading>
   </Simulationsettings>
   <ReplaySettings>
   </ReplaySettings>
  </Wi-Fi>
```

Another segment references configuration of the sensor instrument:

```
  <Sensor>
   <Enabled>1</Enabled>
        <Simulationsettings>
         <INS_Model_File1>C:\...\SensorInsModel1.imu
         </INS_Model_File1>
         <INS_Model_File2>C:\...\SensorInsModel2.imu
         </INS_Model_File2>
         <INS_Model_File3>C:\...\SensorInsModel3.imu
         </INS_Model_File3>
         <INS_Model_File4>C:\...\SensorInsModel4.imu
         </INS_Model_File4>
        </Simulationsettings>
         <ReplaySettings>
         </ReplaySettings>
   </Sensor>
```

Another segment, followed by a closing tag, references configuration of the cellular network instrument:

```
  <Cellular-Condition>
   <Enabled>1</Enabled>
        <ConfigurationFile>C:\...\default.tcf</ConfigurationFile>
         <Simulationsettings>
          <AirInterfaceTechology>1</AirInterfaceTechology>
          <Band>1</Band>
          <DlARFCN>1</DlARFCN>
          <PathLoss>45</PathLoss>
         </Simulationsettings>
         <ReplaySettings>
         </ReplaySettings>
  </Cellular-Condition>
 </HLTS_configuration>
```

Any of the information referenced from other files could be directly incorporated into this file.

In FIG. 7, the root class for the development library services is LBS 715, short for Location-based Services. Engine classes correspond to instruments that generate signals. Engine classes contain functionality required to control and configure the instruments. APIs of the engine classes can be exposed through a hybrid engine class (not shown).

Cellular engine class 720 exposes AirAccessHS 721, which provides access to drivers for their access cellular network emulation 731, 741. Through the driver AirAccessHS 741, the controller PC 700 and communicates with a cellular signal generator and network emulator 771. One suitable cellular instrument is the commercially available SR3420 provided by Spirent, modified for use in hybrid system.

The WiFi engine class 722 provides access to the driver for WiFi access point emulation 733. The WiFi engine class exposes genomes and functions used to control WiFi simulation. Examples of control parameters include WiFi status, WiFi operating mode, WiFi broadcast message type, WiFi version type, and WiFi security. A variety of functions are provided to configure, query and control actions of the WiFi signal generator. Move replay and simulation modes are supported by the WiFi engine 722. The WiFi simulation driver 733 acts as an interface between the WiFi engine class 722 and the WiFi signal generation instrument 773. It provides APIs used to control the WiFi signal generator 773. In one implementation, it uses remote commands in XML format to communicate with the WiFi signal generator. The remote commands can refer to either in operation or data associated with the operation.

In one implementation, both GNSS and sensor signals are generated by a single instrument 775. In this implementation, the GNSS engine and sensor engine 723, 726 both interact with a GNSS instrument class 725. The GNSS engine 723 includes functions to control generation of positioning signals from satellites by the GNSS signal generator 775. The sensor engine 726 controls sensor simulation. It can be implemented as a DLL that shares information between GNSS and sensor simulations.

The GNSS engine 723 and sensor engine 726, through the GSS instrument 725, interact with the driver object 737 and PosApp 747. These driver objects act as an interface between the instrument class 725 and the signal generating instrument 775. The driver provides APIs that can be used to control the signal generator. These APIs can be implemented as remote commands, using XML formats and referring to an operation or data associated with operation. Using this driver 737, users can provide information such as navigation data, signal arrival angle and power level to the signal generator. The signal generator 775 can modulate signals the standard and nonstandard combinations of codes and navigation data. Satellite orbits and navigation data describing the satellites can be manipulated through these APIs.

The position engine 727 and position server 728 interact closely. They provide access to both WiFi positioning and cellular network based positioning servers. Recall that the WiFi positioning server 231, 531 responds to data regarding WiFi access points, to assist in position localization and position determination. The position server 728 provides the basic functionality to interact with such WiFi positioning servers, as well as assisted GNSS servers on cellular networks. It provides generic functions that can be overridden for specific position servers, SSE position servers 729. It will include both enumerations and functions. Examples of enumerations are method type, positioning method, position server protocol, transport type, control plane protocol and user plane protocol. Functions allow configuration of, querying to and directing actions by the positioning server. Both replay and simulation modes can be supported.

Specific positioning servers can interact with the development library services 710 test control API 739 and a particular positioning engine. In one implementation, an SSE Position Server 729 can communicate directly with the UE/UUT/DUT 719.

The functions described in FIG. 7 can be combined in fewer modules than illustrated or distributed among more modules. One or more controller PCs or other computer devices can be used to run the modules identified. One or more instruments can be controlled. In particular, sensor simulation and GNSS signal simulation could easily be performed by different instruments. Or, a generator of multiple signal types can be combined into a single instrument.

FIGS. 8, 9 and 12-16 depict implementations of the graphic user interface. In one implementation, a model view view model (MVVM) pattern is used to construct this interface. The view model and model classes can share the public interface SDCSInterface. The model class can inherit the interface and implement the functions defined in the interface. It can communicate with the hybrid engine to create, load and run scenarios as well as to update panels of the GUI with information regarding a test. In other implementations, other patterns of interfaces can be used. While separate areas of the screen are described herein as being separate panels, those skilled in the art will understand that the information in panels can be combined into a single object and have the same appearance as two separate objects. In this application, panels can either be visually distinct or implemented as separate objects.

Figure 8:
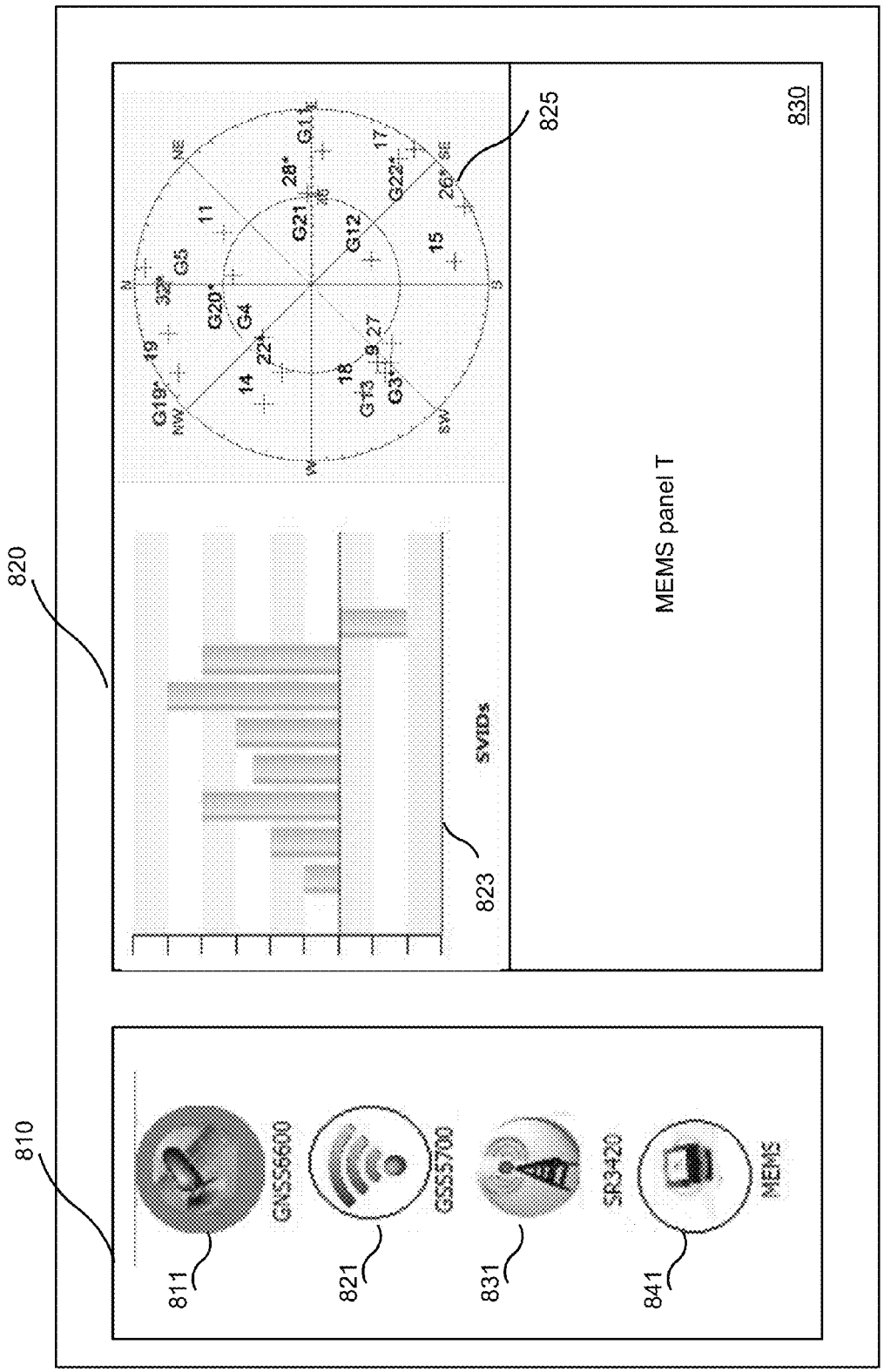
FIGS. 8-9 are example GUIs that can be generated by the SDCS.

FIG. 8 includes panels for instruments 810, GNSS data 820 and MEMS sensor data 830. The instruments panel depicts currently active signal generation instruments. In this illustration, the active instruments are the GSS signal generator 811, a WiFi signal generator 821, a cellular signal generator and network emulator 831 and a MEMS signal generator 841. Properties of the various instruments can be selected by clicking on the instrument icons. Instruments that are not active for particular test a either not appear in the panel 810 or may be grayed out to indicate that they are available but not in use.

The GSS signal panel 820 includes signal strength for various satellites 823 and a sky map of the locations of various satellites 825. During a test, as time advances, the satellite positions move. Other satellite related data that can be included in this panel is described in U.S. application Ser. No. 12/976,756, which was previously said discussed and incorporated by reference.

The MEMS signal panel 830 includes signals corresponding to a variety of MEMS sensors, such as an Inertial Measurement Unit (IMU), which includes three accelerometers, a magnetometer, a gyroscope and a barometric sensor. The data available from these sensors is discussed above.

Figure 9:
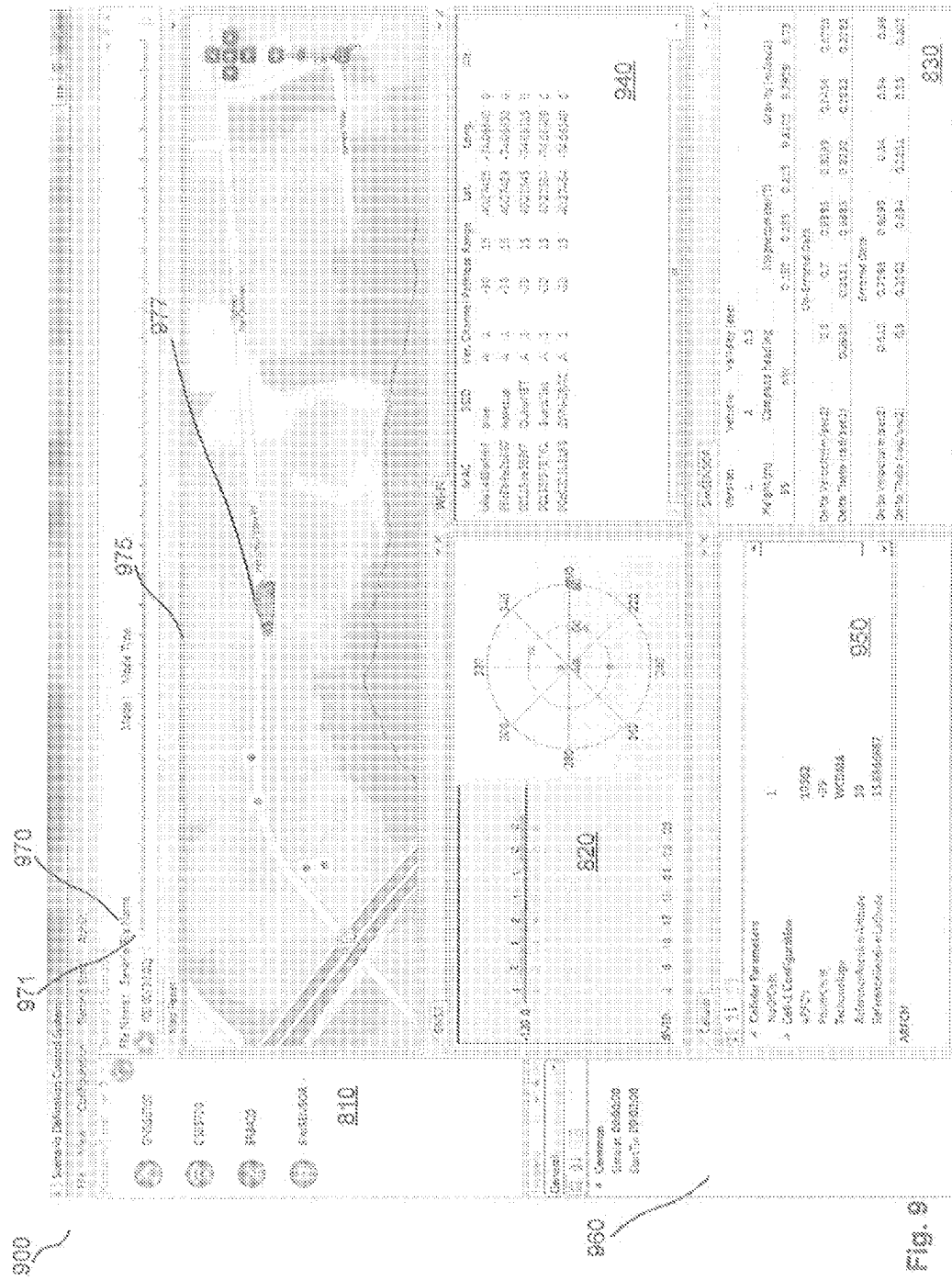

FIG. 9 includes the panels in FIG. 8 and additional panels. The panels for instruments 810, GNSS data 820 and MEMS sensor data 830 are repeated. Added to the web page 900 are panels for WiFi APs 940, for cells in a network 950, for instrument properties and configuration 960 and for test route visualization 970.

The instrument properties panel 960 can be accessed by clicking on the icons in panel 810. For the GNSS instrument 811, properties can include: scenario location, enablement of signal generation; definition file; scenario start date; scenario start time; scenario duration; and simulation or replay mode. When simulation mode is selected, simulation settings may include vehicle type, motion trajectory; user motion file; and/or Yuma file almanac update. When replay mode is selected, properties can include a NMEA route file, a Yuma and constellation satellite.

For the WiFi instrument 821, properties can include: enablement of signal generation; scenario location; database file for access points; and simulation or replay mode. When simulation mode is selected, properties can include simulation model, to slope model or shadow fading model.

For the cellular instrument 831, properties can include: enablement of signal generation; scenario location; and simulation or replay mode.

For the MEMS instrument 841, properties displayed in panel 960 can include: the MEMS noise model, noise model parameters and errors including bias and drift.

Panel 940 is dedicated to WiFi related data. When executing a hybrid scenario, this panel can display the latitude, longitude, altitude, axis point index, enablement, MAC address, SSID, version, channel, security, transmit power, receive power, path loss, and/or range to device under test. Depending on the mode of the scenario, applicable fields will be selected. These fields are further explained in the previously referenced application that has been incorporated.

The cellular panel 950 displays a number of fields related to cell tower and cellular network configuration. Values that can be displayed include Arfcn or eArfcn, power level, cellular technology, number of cells, user equipment connection state, reference receiver latitude, reference receiver longitude, and reference receiver altitude.

The file information panel 970 allows the user to load and run an existing scenario. Features of this panel include a filename, progress slider 971, a map imported from the file that displays the test path 975 and an icon 977 representing the current location of the device under test. The test automator can receive a pause command or a repositioning of the slider and coordinate responses by the instruments involved in a test. In real time, a test user can move ahead to a later part of a test scenario or rerun an earlier part of the scenario, using slider 971. When the slide and test progress are adjusted, the position of the icon 977 is updated to match.

Figure 12:
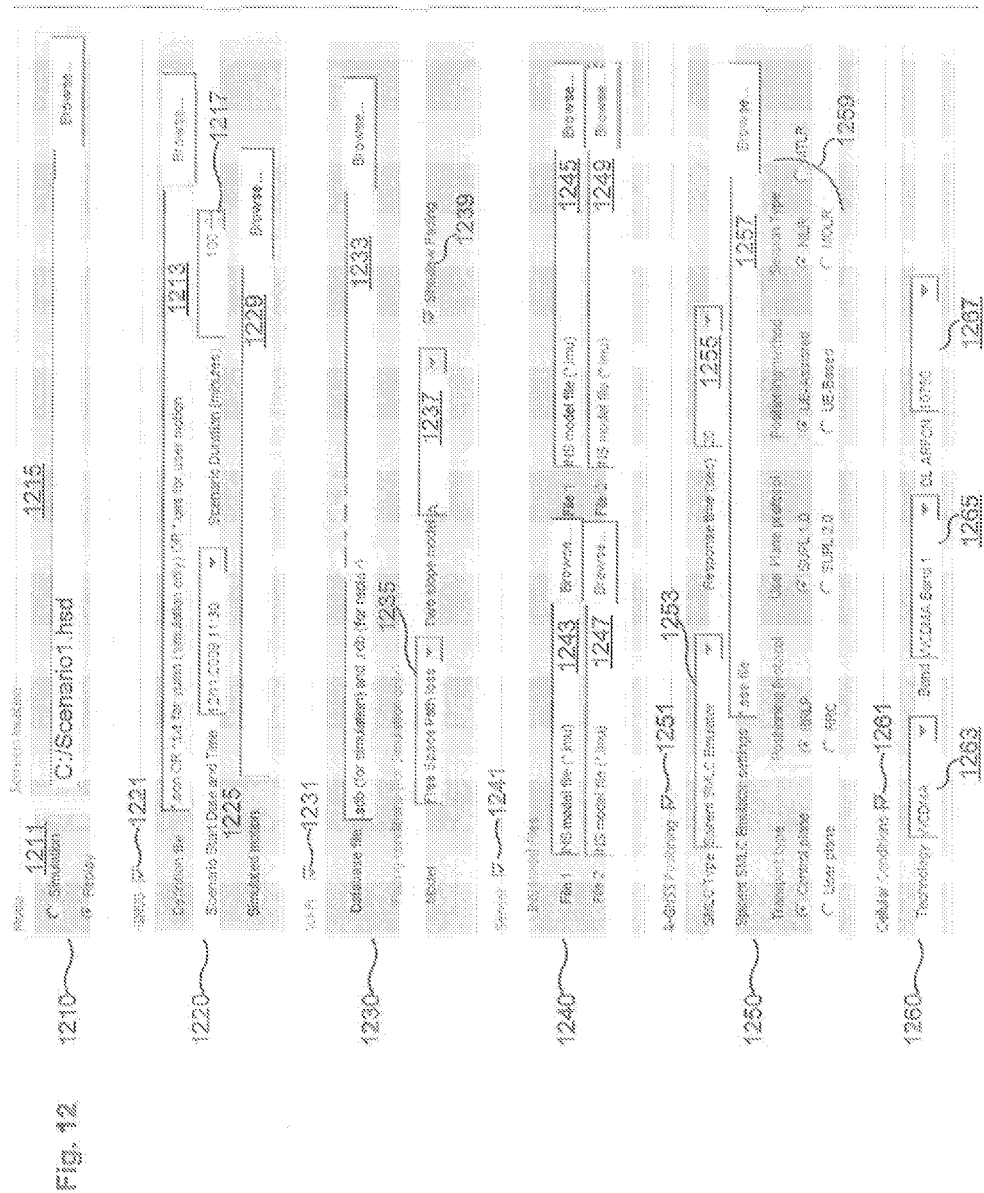
FIG. 12 is an example of a test creator interface.

FIG. 12 is an example of an interface used to specify a coherent test scenario using replay 1211 and producing signals for GNSS 1221, WiFi 1231, MEMS sensors 1241, assisted GNSS (A-GNSS) 1251 and a cellular network 1261. The components of the test are specified in separate panels for selecting a mode 1210, specifying GNSS signal parameters 1220, specifying WiFi signal parameters 1230, specifying MEMS sensor signal parameters 1240, specifying A-GNSS signal parameters 1250 and specifying cellular network parameters 1260.

The panel for selecting a mode 1210 supports choices 1211 among at least simulation and replay modes. A saved scenario file can be selected 1215 by browsing or typing a file name.

The panel for specifying GNSS signal parameters 1220 also allows selection 1213 of a scenario file 1213. Supported formats for the definition file include SCN, Yuma and UMT formats. The panel 1220 accepts time parameters for the test: start date and time 1225 and duration 1217. Simulated motion also can be loaded from a file 1229.

The panel for specifying WiFi signal parameters 1230 accepts a database 1233 of WiFi APs to emulate. Supported formats depend on the selected mode: SDB for simulation and RDB for replay. Other WiFi parameters include model type 1235, whether to apply a two slope fading model 1237 and whether to emulate shadow fading 1239.

The panel for specifying MEMS sensor signal parameters 1240 supports specification of up to four model files 1243, 1245, 1247, 1249 that specify the MEMS signals to generate during a test.

In one implementation, the panel for specifying A-GNSS signal parameters 1250 accepts a variety of parameters. A type of Serving Mobile Location Center (SMLC), which provides assistance data to the phone can be selected 1253, along with a response time 1255. An SMLC emulator file can be specified 1257. Additional parameters 1259 can include transport type, positioning protocol, user plane protocol, positioning method and session type.

The panel for specifying cellular network parameters 1260 supports specification of a cellular technology 1263, an operating RF band 1265 and a DL aRfcn 1267.

Figure 13:
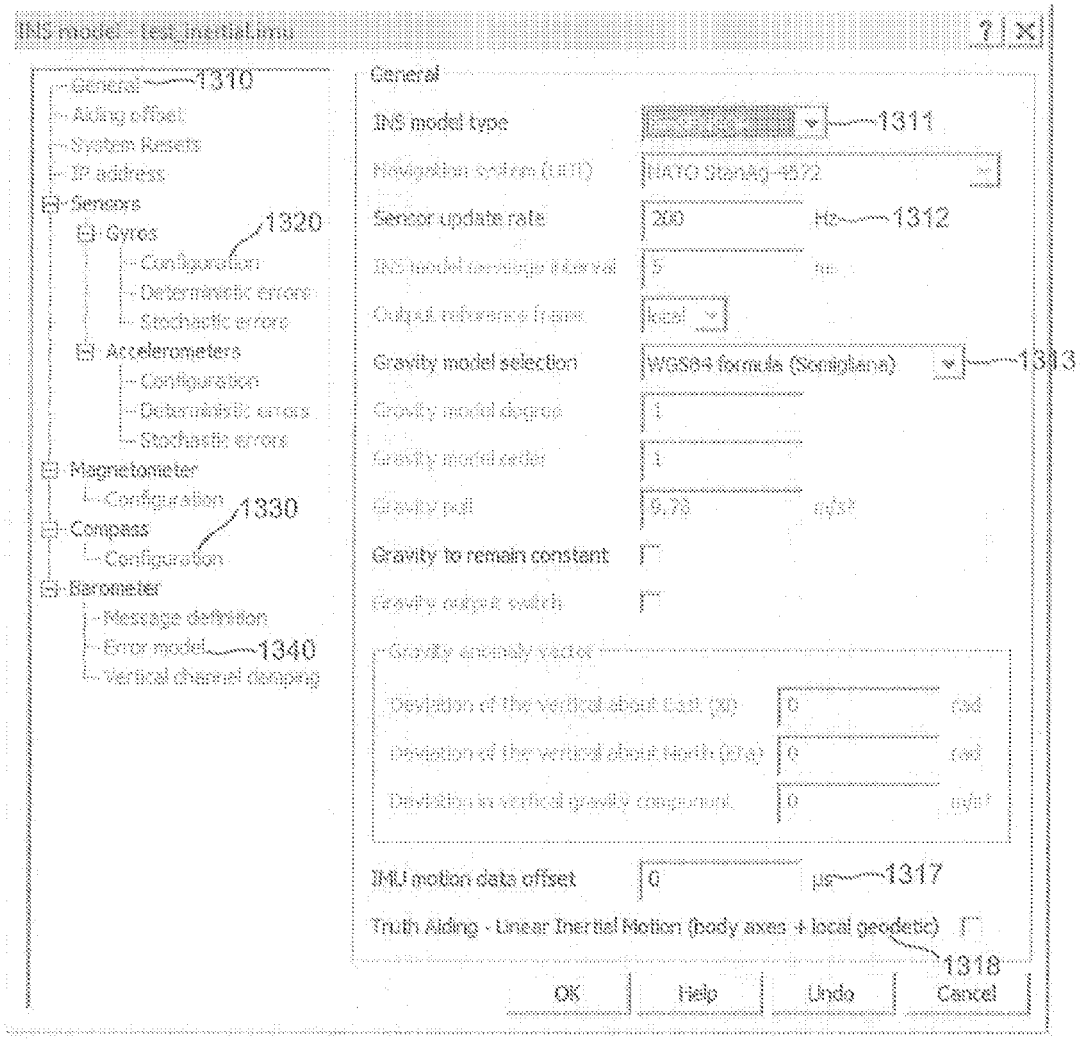
FIG. 13 is an example of an interface used to specify general parameters for sensors.

FIG. 13 is an example of an interface used to specify general parameters for sensors. The left panel supports selection of configuration screens, including general 1310, gyro configuration 1320, compass configuration 1330 and barometer error model 1340 screens which appear in FIGS. 13-16.

The right hand panel of FIG. 13 accepts a variety of configuration parameters, which are self-apparent from their titles. The INS model type 1311 is SimSENSOR, a Spirent® proprietary format. The sensor update rate 1312 is 200 Hz, which corresponds to a message interval of 5 ms. The gravity model selection 1313 is a variant of WGS84. An inertial measurement unit data timing offset 1317 can be specified, but is set to zero in this example. An option is available 1313 for truth aiding of linear inertial motion, using body axes and local geodetic information, which is not checked in this example.

Figure 14:
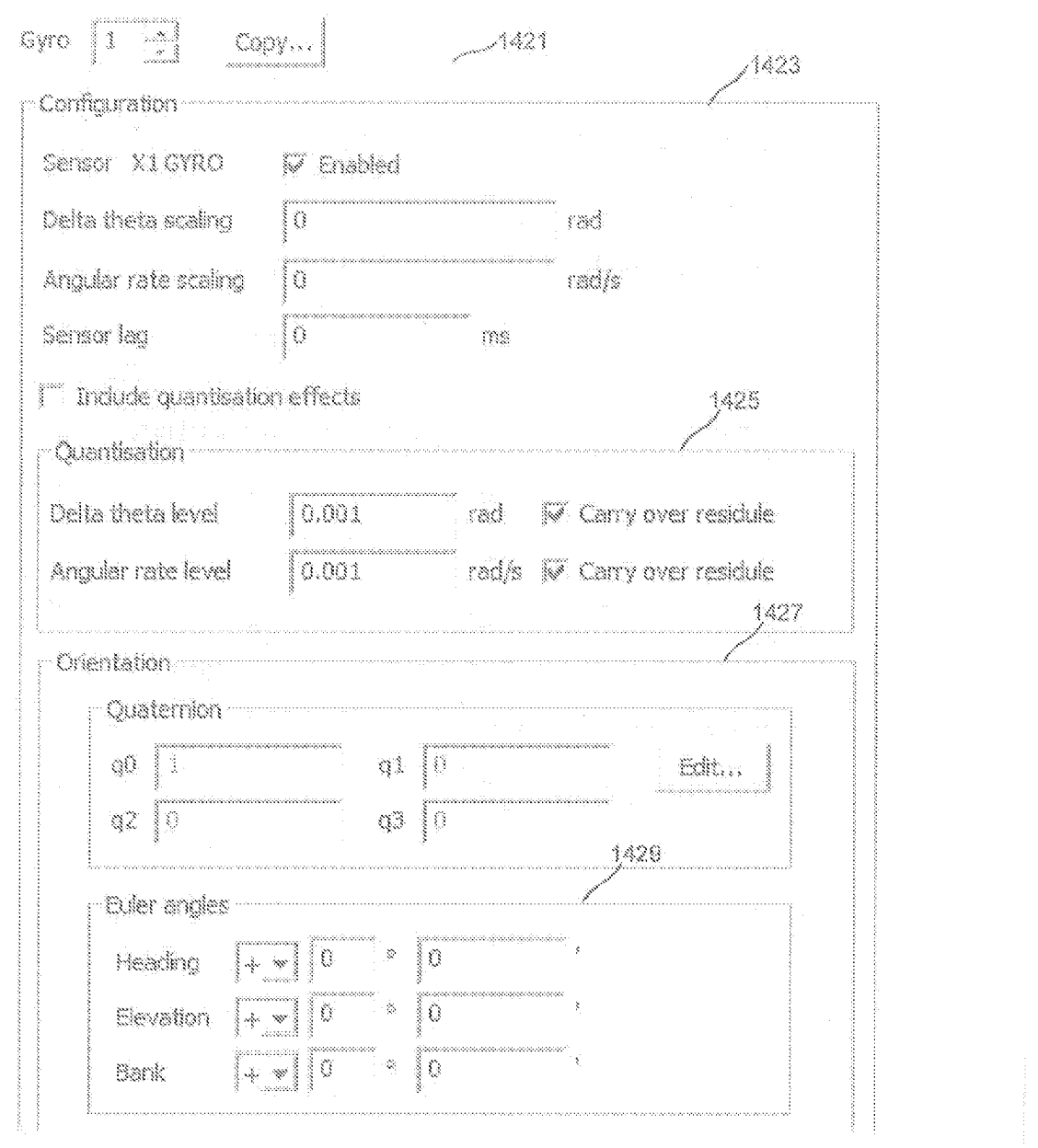

FIG. 14 is an example of an interface used to specify general parameters for sensors. A left panel as appears in FIG. 13 can be combined with the panel in this figure, for configuration panel navigation purposes. In the panel depicted, a gyro number is selected 1421. The configuration of this gyro includes genera, quantization, and orientation parameters. The x1 gyro is enabled. No scaling or lag factors are specified. Quantization effects are not checked. In the quantization sub panel 1425, delta theta and angular rate levels are specified, with the option to carry over residuals being selected. In the orientation subpanel, parameters for quaternion 1427 are left at zero, as are the Euler angle parameters 1429.

Figure 15:
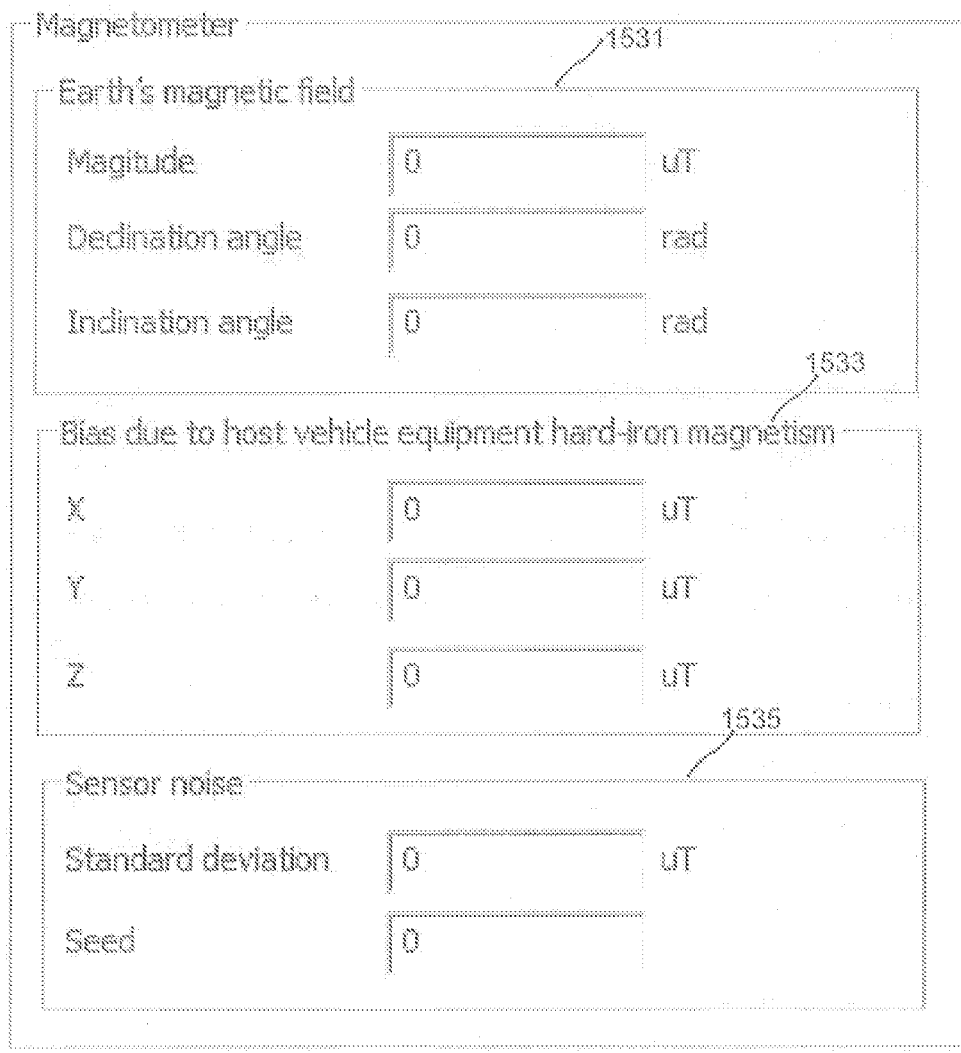
FIG. 15 is an example of an interface used to specify magnetometer parameters.

FIG. 15 is an example of an interface used to specify magnetometer parameters. A left panel as appears in FIG. 13 can be combined with the panel in this figure. Subpanels are provided for parameters related to the earth's magnetic field 1531, bias due to host vehicle equipment hard-iron magnetism 1533, and sensor noise 1535. In this example, no parameter values have been added.

FIG. 16 is an example of an error model. In particular, this illustrates a barometer error model. A left panel as appears in FIG. 13 can be combined with the panel in this figure. Subpanels are provided for ramp error 1643, sinusoidal error 1645 and Gaussian-Markov noise 1647. Tin this example, the error model is enabled. No fixed offset is specified. Values have not been specified in the subpanels, except a sinusoidal period of 1000 seconds and a Gaussian-Markov noise time constant of 100 seconds. A random seed of 1 also has been specified as a starting point for a pseudo-random number or noise generator.

The several configuration panel examples provided here are not intended to be exhaustive or exclusive. For instance, additional configuration panels are accessible from the left navigation panel of FIG. 13. These additional panels are identified, for general purposes, to include aiding offsets, system resets and IP address(es). Additional sensor panels expose parameters including gyro and accelerometer error parameters for deterministic and stochastic error. Barometer panels expose parameters for message definition and vertical channel dampening.

Some Particular Implementations

Figure 10:
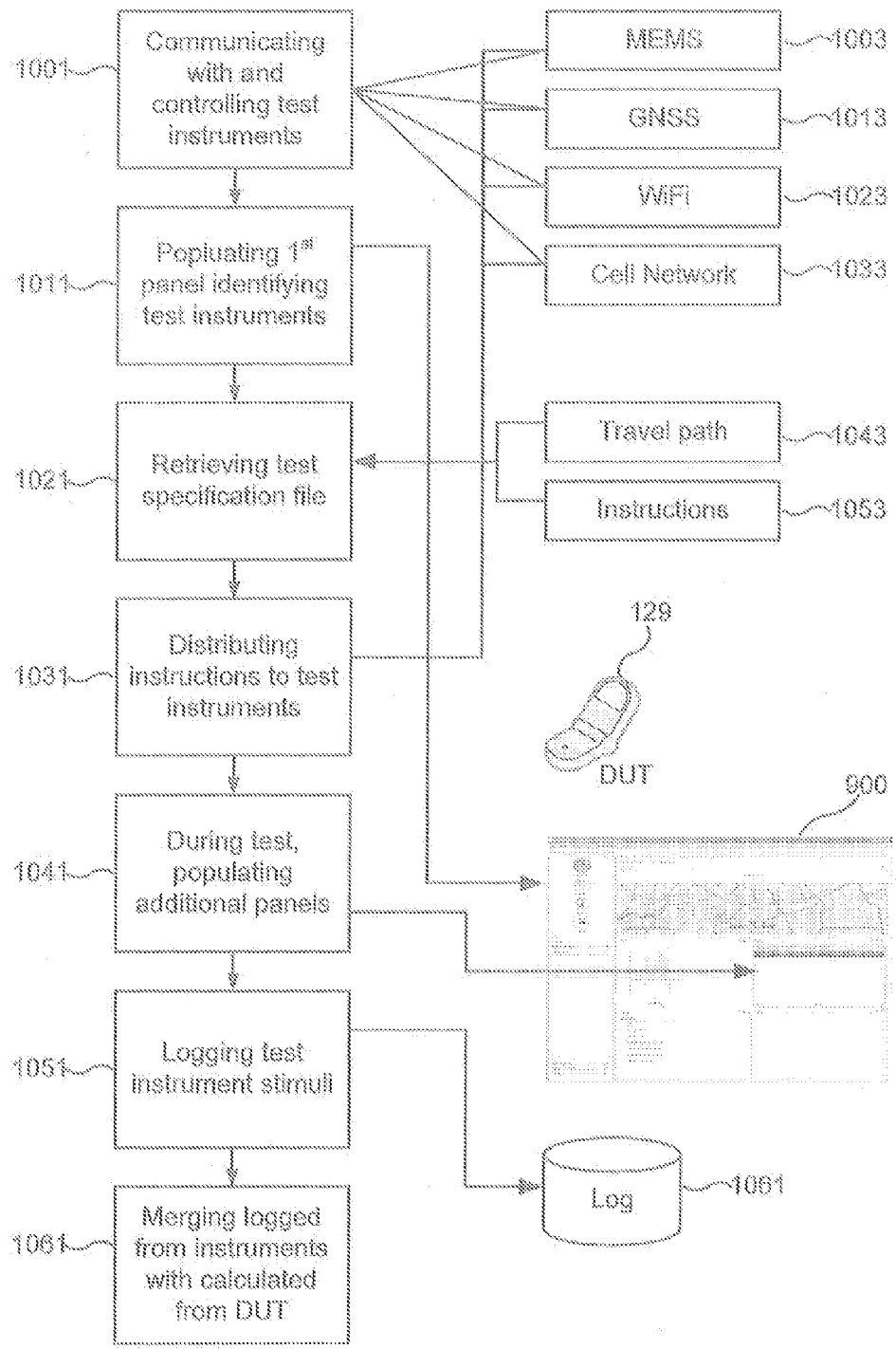
FIGS. 10-11 are example flow charts of process that implement aspects of the technology disclosed.

In one implementation, illustrated in FIG. 10, a method is described that includes testing positioning capabilities of a portable device under test. The method can include communicating with and controlling operation of one or more test instruments 1001, using the test instruments include a microelectromechanical sensor signal emulator 1003; and a GNSS satellite constellation RF signal emulator 1013. The method further includes populating a first panel to be displayed with an identification of the test instruments 1011 being controlled. It includes retrieving from storage a test specification file 1021 that includes: a travel path 1043 or reference to a travel path followed by the portable device during a test and instructions 1053 or references to instructions to be run on the test instruments as the portable device is tested along the travel path. The travel path includes for at least the microelectromechanical sensor signal emulator a pedestrian model or a vehicle ride model that describes orientation and motion of the portable device as it moves along the travel path. The method also can include distributing the retrieved instructions 1031 or references to the instructions to the test instruments and, during the test, populating third and fourth panels to be displayed, respectively, with reports of signals from the micro-electromechanical sensor signal emulator and the GNSS satellite constellation RF signal emulator 1041.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

During the test, a second panel to be displayed can be populated with a map representing at least a section of the travel path and showing a current location of the portable device 900. The micro-electromechanical sensor signal emulator can generate sensor signals representing at least magnetometer directional orientation and inertial acceleration. The pedestrian model or the vehicle ride model can describe velocity, acceleration and change in acceleration for at least 10 sample points per second, or, at least 100 sample points per second.

In this implementation, the test instruments can further include a WiFi access points RF signal emulator 1023 and a cellular network and RF signal emulator 1033. The method can further include, during the test, populating fifth and sixth panels to be displayed 1041, respectively, with reports of signals from the WiFi access points RF signal emulator, and the cellular network and RF signal emulator.

The reports of the signals during the test can be received from the test instruments and/or received from the portable device under test.

During the test, reports of the signals from the test instruments can be logged 1051 to memory 1061. After the test, the method can include merging the logged signals from the test instruments with time stamped positions calculated by the portable device and processing the data to annotate the logged signals with a comparison of the travel path simulated for the portable device and the positions calculated by the portable device 1061.

The reports of the signals during the test can be received from the portable device under test. At least some of the instructions or references to instructions can represent parameters for simulation of signals. At least some of the instructions or references to instructions represent signal properties to be replayed from signal properties captured during a field survey.

The method can further include, during the test, receiving reports from the portable device of a calculated position and populating the map with the calculated position and an indication of differential between the current location, according to one or more of the test instruments, and the calculated position, according to the portable device under test.

It can further include, during the test, showing on at least one display panel an overlay of one or more of noise, jamming and fading signal impairments for one or more of the RF signals and logging the signal impairments as reported by the test instruments.

Other implementations may include a non-transitory computer readable storage medium storing instructions executable by a processor to perform a method as described above.

Yet another implementation may include a system including memory and one or more processors operable to execute instructions, stored in the memory, to perform a method as described.

In another implementation, a method is described that includes configuring test instruments to test positioning capabilities of a portable device under test. This method includes configuring control of operation of one or more test instruments. The test instruments include: a micro-electromechanical sensor signal emulator; a GNSS satellite constellation RF signal emulator; a WiFi access points RF signal emulator; and a cellular network and RF signal emulator. The method includes populating a first panel to be displayed on a screen with an identification of the test instruments being configured and retrieving a test specification file. The test specification file includes: a travel path or reference to a travel path followed by the portable device during a test and instructions or references to instructions to be run on the test instruments as the portable device is tested along the travel path. The method includes distributing the retrieved instructions or references to the instructions to the test instruments. It further includes, during the test, populating third, fourth, fifth and sixth panels to be displayed, respectively, with reports of signals from the micro-electromechanical sensor signal emulator, the GNSS satellite constellation RF signal emulator, the WiFi access points RF signal emulator, and the cellular network and RF signal emulator.

This method and other implementations of the technology disclosed can each optionally include one or more of the following features and/or features described in connection with additional methods disclosed.

During the test, the method can include populating a second panel to be displayed with a map representing at least a section of the travel path and showing a current location of the portable device.

Other implementations may include a non-transitory computer readable storage medium storing instructions executable by a processor to perform a method as described above. Yet another implementation may include a system including memory and one or more processors operable to execute instructions, stored in the memory, to perform a method as described.

Figure 11:
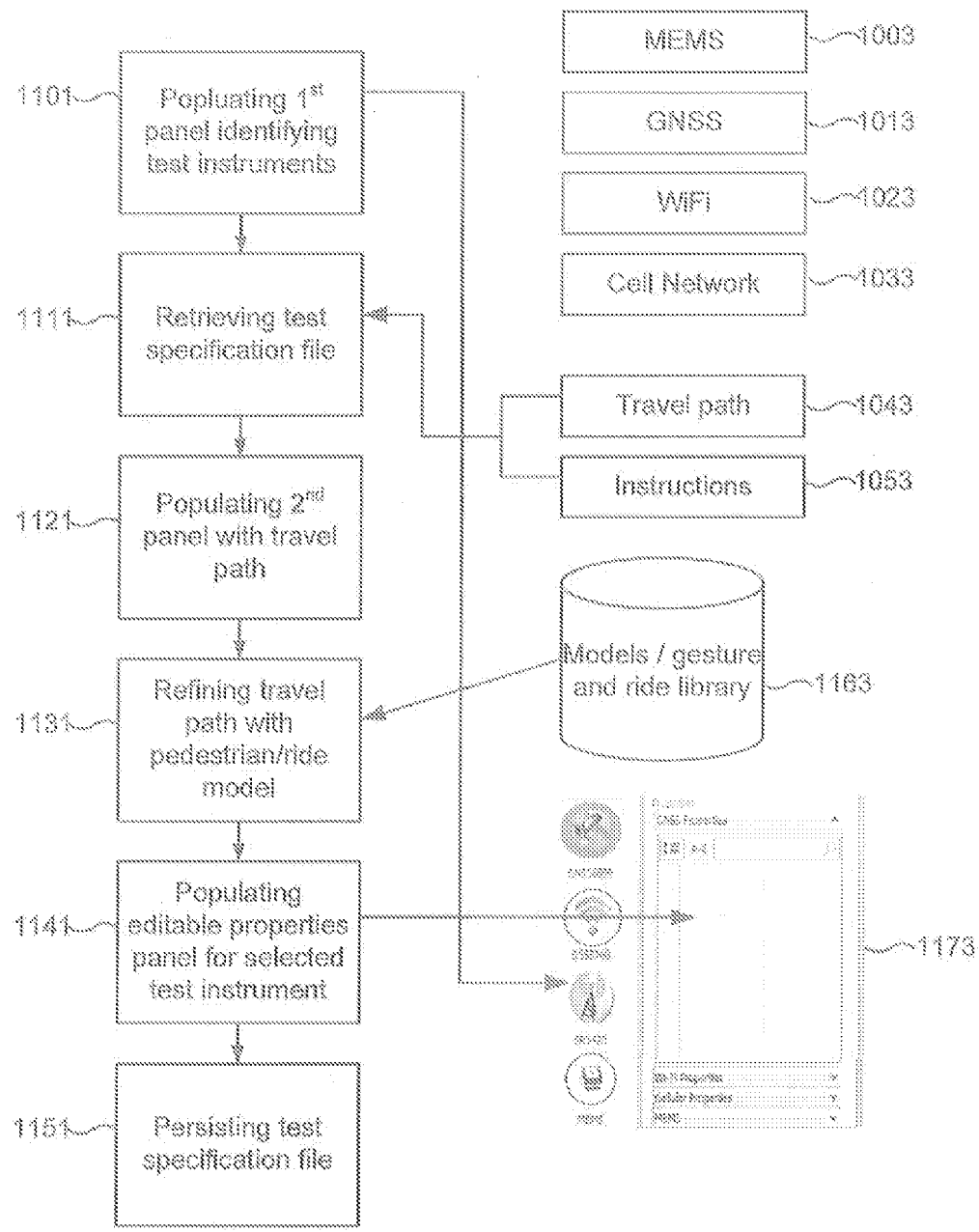

In another implementation, illustrated in FIG. 11, a method is described that includes configuring test instruments to test positioning capabilities of a portable device under test. The method can include configuring control of operation of one or more test instruments. The test instruments include: a micro-electromechanical sensor signal emulator 1003; a GNSS satellite constellation RF signal emulator 1013; a WiFi access points RF signal emulator 1023; and a cellular network and RF signal emulator 1033. The method includes populating a first panel to be displayed on a screen with an identification of the test instruments 1101 being configured. During configuration of a test, the method can include populating a second panel to be displayed with a map representing at least a section of a travel path 1021 to be followed by the portable device under test; and further include populating an eighth panel to be displayed with editable properties 1141 of a selected test instrument that vary with time. The method can include receiving 1131 and persisting 1151 edited properties of the selected instruments as a test specification file that includes: the travel path 1043 or reference to the travel path; and instructions or references to instructions 1053 to be run on the test instruments as the portable device is tested along the travel path.

This method and other implementations of the technology disclosed can each optionally include one or more of the following features and/or features described in connection with additional methods disclosed.

The travel path further includes a pedestrian model or a vehicle ride model 1163 that describes the orientation and motion of the portable device as it travels along the travel path.

The method can further include retrieving 1111 the persisted test specification file 1043, 1053; and populating the second and eighth panels with data from the test specification file responsive to selection of a selected test instrument.

At least some of the instructions or references to instructions can represent previously edited parameters for simulation of signals. At least some of the instructions or references to instructions represent signal properties captured during a field survey.

Other implementations may include a non-transitory computer readable storage medium storing instructions executable by a processor to perform a method as described above. Yet another implementation may include a system including memory and one or more processors operable to execute instructions, stored in the memory, to perform a method as described.

We claim as follows:

1. A method of testing positioning capabilities of a portable device under test, the method including:
    communicating with and controlling operation of one or more test instruments, wherein the test instruments include:
        a micro-electromechanical sensor signal emulator; and
        a GNSS satellite constellation RF signal emulator;
    populating a first panel to be displayed with an identification of the test instruments being controlled;
    retrieving from storage a test specification file that includes:
        a travel path or reference to a travel path followed by the portable device during a test, including for at least the micro-electromechanical sensor signal emulator a pedestrian model or a vehicle ride model that describes orientation and motion of the portable device as it moves along the travel path; and
        instructions or references to instructions to be run on the test instruments as the portable device is tested along the travel path;
    distributing the retrieved instructions or references to the instructions to the test instruments; and
    during the test, populating third and fourth panels to be displayed, respectively, with reports of signals from the micro-electromechanical sensor signal emulator and the GNSS satellite constellation RF signal emulator.

2. The method of claim 1, wherein during the test, populating a second panel to be displayed with a map representing at least a section of the travel path and showing a current location of the portable device.

3. The method of claim 1, wherein the micro-electromechanical sensor signal emulator injects sensor signals representing at least magnetometer directional orientation and inertial acceleration.

4. The method of claim 1, wherein the pedestrian model or the vehicle ride model describes velocity, acceleration and change in acceleration for at least 10 sample points per second.

5. The method of claim 1, wherein the pedestrian model or the vehicle ride model describes velocity, acceleration and change in acceleration for at least 100 sample points per second.

6. The method of claim 1, wherein:
    the test instruments further include:
        a WiFi access points RF signal emulator; and
        a cellular network and RF signal emulator;
    further including, during the test, populating fifth and sixth panels to be displayed, respectively, with reports of signals from the WiFi access points RF signal emulator, and the cellular network and RF signal emulator.

7. The method of claim 1, wherein the reports of the signals during the test are received from the test instruments.

8. The method of claim 7, wherein the reports of the signals during the test are also received from the portable device under test.

9. The method of claim 7, further including:
    during the test, logging to memory the reports of the signals from the test instruments;
    after the test, merging the logged signals from the test instruments with time stamped positions calculated by the portable device; and
    processing the data to annotate the logged signals with a comparison of the travel path simulated for the portable device and the positions calculated by the portable device.

10. The method of claim 1, wherein the reports of the signals during the test are received from the portable device under test.

11. The method of claim 1, wherein at least some of the instructions or references to instructions represent parameters for simulation of signals.

12. The method of claim 1, wherein at least some of the instructions or references to instructions represent signal properties to be replayed from signal properties captured during a field survey.

13. The method of claim 2, further including:
    during the test, receiving reports from the portable device of a calculated position; and
    populating the map with the calculated position and an indication of differential between the current location, according to one or more of the test instruments, and the calculated position, according to the portable device under test.

14. The method of claim 1, further including:
    during the test, showing on at least one display panel an overlay of one or more of noise, jamming and fading signal impairments for one or more of the RF signals; and
    logging the signal impairments as reported by the test instruments.

15. A method of configuring test instruments to test positioning capabilities of a portable device under test, the method including:
    configuring control of operation of one or more test instruments, wherein the test instruments include:
        a micro-electromechanical sensor signal emulator;
        a GNSS satellite constellation RF signal emulator;
        a WiFi access points RF signal emulator; and
        a cellular network and RF signal emulator;
    populating a first panel to be displayed on a screen with an identification of the test instruments being configured;
    retrieving a test specification file that includes:
        a travel path or reference to a travel path followed by the portable device during a test; and
        instructions or references to instructions to be run on the test instruments as the portable device is tested along the travel path;
    distributing the retrieved instructions or references to the instructions to the test instruments;

during the test, populating third, fourth, fifth and sixth panels to be displayed, respectively, with reports of signals from the micro-electromechanical sensor signal emulator, the GNSS satellite constellation RF signal emulator, the WiFi access points RF signal emulator, and the cellular network and RF signal emulator.

16. The method of claim 15, wherein during the test, populating a second panel to be displayed with a map representing at least a section of the travel path and showing a current location of the portable device.

17. A method of configuring test instruments to test positioning capabilities of a portable device under test, the method including:
configuring control of operation of one or more test instruments, wherein the test instruments include:
a micro-electromechanical sensor signal emulator;
a GNSS satellite constellation RF signal emulator;
a WiFi access points RF signal emulator; and
a cellular network and RF signal emulator;
populating a first panel to be displayed on a screen with an identification of the test instruments being configured;
during configuration of a test, populating a second panel to be displayed with a map representing at least a section of a travel path to be followed by the portable device under test;
during configuration of the test, populating an eighth panel to be displayed with editable properties of a selected test instrument that vary with time; and
receiving and persisting edited properties of the selected instruments as a test specification file that includes:
the travel path or reference to the travel path; and
instructions or references to instructions to be run on the test instruments as the portable device is tested along the travel path.

18. The method of claim 17, wherein the travel path further includes a pedestrian model or a vehicle ride model that describes the orientation and motion of the portable device as it travels along the travel path.

19. The method of claim 17, further including:
retrieving the persisted test specification file; and
populating the second and eighth panels with data from the test specification file responsive to selection of a selected test instrument.

20. The method of claim 18, wherein at least some of the instructions or references to instructions represent previously edited parameters for simulation of signals.

21. The method of claim 18, wherein at least some of the instructions or references to instructions represent signal properties captured during a field survey.

* * * * *